United States Patent
Ohzeki

(10) Patent No.: US 8,449,100 B2
(45) Date of Patent: May 28, 2013

(54) INKJET RECORDING METHOD

(75) Inventor: Tomoyuki Ohzeki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 288 days.

(21) Appl. No.: 12/723,920

(22) Filed: Mar. 15, 2010

(65) Prior Publication Data

US 2010/0238246 A1 Sep. 23, 2010

(30) Foreign Application Priority Data

Mar. 19, 2009 (JP) ................................ 2009-068188

(51) Int. Cl.
*B41J 2/01* (2006.01)

(52) U.S. Cl.
USPC ........... 347/102; 347/100; 347/104; 430/200; 522/164; 524/428; 524/777

(58) Field of Classification Search
None
See application file for complete search history.

(56) References Cited

U.S. PATENT DOCUMENTS

| | | | |
|---|---|---|---|
| 3,271,341 A * | 9/1966 | Garrison, Jr. ................. | 524/777 |
| 5,447,982 A * | 9/1995 | Kamba et al. ................. | 524/458 |
| 6,913,866 B2 * | 7/2005 | Shimomura et al. .......... | 430/200 |
| 7,977,400 B2 * | 7/2011 | Taniguchi et al. ............ | 522/164 |
| 2004/0189764 A1 * | 9/2004 | Aono et al. .................... | 347/100 |
| 2006/0221166 A1 * | 10/2006 | Inoue ............................ | 347/104 |

FOREIGN PATENT DOCUMENTS

| | | |
|---|---|---|
| JP | 2002-225414 A | 8/2002 |
| WO | WO 01/08895 A1 | 2/2001 |

OTHER PUBLICATIONS

Japanese Notice of Reasons for Rejection for Japanese Application No. 2009-068188, dated Jan. 29, 2013.

* cited by examiner

*Primary Examiner* — Matthew Luu
*Assistant Examiner* — John P Zimmermann
(74) *Attorney, Agent, or Firm* — Birch, Stewart, Kolasch & Birch, LLP.

(57) ABSTRACT

An inkjet recording method of the invention includes at least: applying, onto a recording medium, an ink composition containing at least a pigment, a copolymer containing at least a fluorine atom, a water-soluble organic solvent, and water, thereby forming an image; drying the image by removing the water-soluble organic solvent and at least a part of the water from the recording medium; and heat-fixing the image onto the recording medium by bringing a surface of the image into contact with a heating member, and may further include other processes.

6 Claims, No Drawings

INKJET RECORDING METHOD

CROSS-REFERENCE TO RELATED APPLICATION

This application claims priority under 35 USC 119 from Japanese Patent Application No. 2009-068188 filed on Mar. 19, 2009 the disclosure of which is incorporated by reference herein.

BACKGROUND OF THE INVENTION

1. Field of the Invention

The present invention relates to an inkjet recording method.

2. Description of the Related Art

An inkjet recording method includes performing recording by ejecting an ink in the form of droplets from a large number of nozzles disposed at an inkjet head and has been widely used because high-quality images can be recorded on various recording media, etc.

For example, pigments are widely used in a coloring material as one component contained in ink materials. The pigments are dispersed in a medium, such as water, for use. When the pigments are dispersed for use, the particle diameter when dispersed, stability after dispersion, size uniformity, ejection properties from an ejection head, image density, etc., are important, and various studies on techniques for improving the same have been conducted.

On the other hand, when recording is performed on plain paper or the like, sufficient performance sometimes cannot be obtained with respect to, for example, rubbing resistance (fixability) or resolution, in addition to the image density. In particular, this is the case when increasing the speed of inkjet recording, and a recording method more suitable for high speed recording using a single pass system capable of recording by one operation of a head, as opposed to a shuttle scanning system, is in demand.

WO 01/08895 describes an image recording method which includes using an ink composition containing a colorant and a resin emulsion having fluoroalkyl groups and a reaction solution capable of forming aggregates upon contact with the ink composition is disclosed. WO 01/08895 describes that a favorable image of excellent rubbing resistance can be formed thereby.

SUMMARY OF THE INVENTION

The ink composition described in the pamphlet of WO 01/08895 sometimes lacks ejection reliability and, an offset phenomenon, in which an image is transferred to a heating member, sometimes occurs when the ink composition is applied to a recording medium to form the image thereon and then the heating member contacts the image for heat-fixing the image.

The present invention provides an inkjet recording method having excellent ejection reliability and capable of suppressing the offset phenomenon.

One aspect of the present invention is an inkjet recording method comprising: applying, onto a recording medium, an ink composition comprising a pigment, a copolymer comprising a fluorine atom, a water-soluble organic solvent, and water, thereby forming an image; drying the image by removing the water-soluble organic solvent and at least a part of the water from the recording medium; and heat-fixing the image onto the recording medium by bringing a surface of the image into contact with a heating member.

DETAILED DESCRIPTION OF THE INVENTION

The inkjet recording method of one aspect of the invention includes at least: applying, onto a recording medium, an ink composition containing at least a pigment, a copolymer containing at least a fluorine atom, a water-soluble organic solvent, and water, thereby forming an image; drying the image by removing the water-soluble organic solvent and at least a part of the water from the recording medium; and heat-fixing the image onto the recording medium by bringing a surface of the image into contact with a heating member, and may further include other processes.

The inkjet recording method of the invention may have excellent ejection reliability to form a clear image by using the ink composition containing the copolymer that contains a fluorine atom. The inkjet recording method of the invention may effectively suppress an offset phenomenon, in which an image formed on a recording medium is transferred to a heating member used for fixing the image onto the recording medium. The inkjet recording method of the invention may further improve the rubbing resistance and the adhesion resistance (anti-blocking property) of an image formed thereby.

Ink Application

The inkjet recording method of the invention includes applying, onto a recording medium, an ink composition containing at least a pigment, a copolymer containing at least a fluorine atom, a water-soluble organic solvent, and water. The applied ink composition forms an image on the recording medium.

Ink Composition

The ink composition employed in the invention contains at least a pigment, a copolymer containing at least a fluorine atom, a water-soluble organic solvent, and water, and may further contain other components.

Copolymer Containing Fluorine Atom

The copolymer that contains a fluorine atom employed in the invention (hereinafter sometimes referred to as "fluorine-containing copolymer") is not particularly restricted so long as it contains at least one structural unit containing a fluorine atom and formed from two or more structural units, and may be a vinyl polymer, a condensed polymer or the like. The fluorine-containing copolymer is preferably a vinyl polymer with a view point of the ejection reliability and the property of suppressing the offset phenomenon in heat fixing (hereinafter this property is sometimes referred to as "offset resistance"). That is, the fluorine-containing copolymer is preferably a copolymer containing at least one structural unit derived from a first monomer having a fluorine atom and an ethylenically unsaturated bond.

Herein, the "structural unit (of a polymer) derived from a (specific) monomer" herein means a unit that has a structure which can be typically incorporated into the polymer by employing the (specific) monomer as that to be polymerized for forming the polymer.

First Monomer

The first monomer is not particularly restricted so long as it has a fluorine atom and an ethylenically unsaturated bond. Specific examples include (meth)acrylates, vinyl esters, vinyl ethers, maleates, fumarates, and α-olefins having a polyfluoroalkyl group or a perfluoroalkyl group, and derivatives thereof.

Herein, a "derivative" of a specific compound means a compound obtained by substituting, for at least one atom or at least one atomic group which is a partial structure of the specific compound, another atom or another atomic group.

In the invention, the first monomer is preferably a derivative of acrylic acid containing a fluorine atom or methacrylic acid containing a fluorine atom and, more preferably, a monomer represented by the following Formula (P).

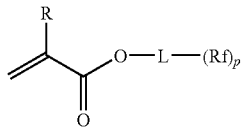

Formula (P)

In Formula (P), Rf represents a fluoroalkyl group having 1 to 20 carbon atoms and 1 to 41 fluorine atoms. Rf is preferably a fluoroalkyl group having 2 to 10 carbon atoms and 1 to 21 fluorine atoms, more preferably a fluoroalkyl group having 2 to 10 carbon atoms and having a trifluoromethyl group at the terminal end and, and further preferably a perfluoroalkyl group having 2 to 10 carbon atoms. The fluoroalkyl group represented by Rf may be either a branched or linear chained fluoroalkyl group, or a cyclic fluoroalkyl group. The fluoroalkyl group represented by Rf may further have a substituent such as an alkyl group or a halogen.

p represents 1 or 2. L represents a bivalent- or trivalent-linking group having 1 to 12 carbon atoms. The linking group represented by L is a bivalent linking group in a case where p is 1 and a trivalent linking group in a case where p is 2. In preferable embodiments, p is 1 and L is a bivalent linking group.

In embodiments, L may represent a linking group containing at least one hetero atom selected from oxygen atom, phosphor atom, sulfur atom, and nitrogen atom in addition to the carbon atom.

When L represents a bivalent linking group, L is preferably a bivalent linking group formed of one or more linking groups selected from an alkylene group having 1 to 12 carbon atoms, an amide bond, a sulfoneamide bond, and an ether bond.

R represents a hydrogen atom or a methyl group.

The monomer represented by the Formula (P) preferably contains 30 mass % or more of a fluorine atom(s) in a monomer molecule with respect to the total amount of the monomer molecule with a view point of the offset resistance.

The monomer represented by the Formula (P) is preferably a monomer represented by one of the following Formulae (1) to (5).

$CF_3(CF_2)_x(CH_2)_yOCOC(R)=CH_2$  Formula (1):

$HCF_2(CF_2)_x(CH_2)_yOCOC(R)=CH_2$  Formula (2):

In Formulae (1) and (2), x is an integer of from 0 to 20, and is preferably an integer of from 2 to 10; y is an integer of from 1 to 10; and R represents a hydrogen atom or a methyl group.

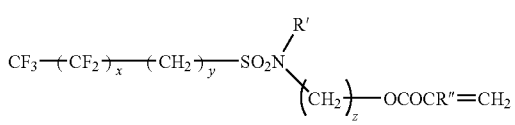

Formula (3)

In Formula (3), x is an integer of from 0 to 20, and is preferably an integer of from 2 to 10; y is an integer of from 1 to 10; z is an integer of from 1 to 4; R' represents an alkyl group or an arylalkyl group; and R" represents a hydrogen atom or a methyl group.

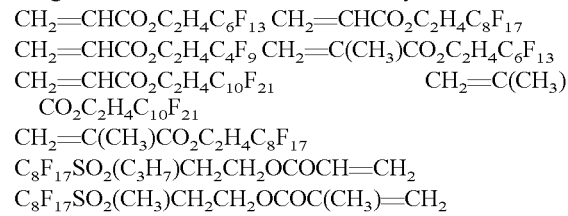

Formula (4)

In Formula (4), x is an integer of from 1 to 7; y is an integer of from 1 to 10; and R represents a hydrogen atom or a methyl group.

$CF_3(CF_2CF_2O)_x(CF_2O)_y(CH_2)_zOCOCR=CH_2$  Formula (5):

In Formula (5), x and y are integers satisfying x+y being from 1 to 20; z is an integer of from 1 to 10; and R represents a hydrogen atom or a methyl group.

Specific examples of the first monomer are shown below, although the invention is not limited thereby.

$CH_2=CHCO_2C_2H_4C_6F_{13}$  $CH_2=CHCO_2C_2H_4C_8F_{17}$
$CH_2=CHCO_2C_2H_4C_4F_9$  $CH_2=C(CH_3)CO_2C_2H_4C_6F_{13}$
$CH_2=CHCO_2C_2H_4C_{10}F_{21}$  $CH_2=C(CH_3)CO_2C_2H_4C_{10}F_{21}$
$CH_2=C(CH_3)CO_2C_2H_4C_8F_{17}$
$C_8F_{17}SO_2(C_3H_7)CH_2CH_2OCOCH=CH_2$
$C_8F_{17}SO_2(CH_3)CH_2CH_2OCOC(CH_3)=CH_2$

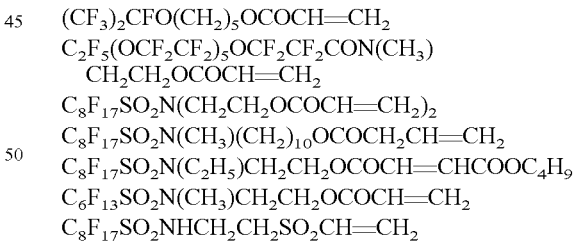

$C_7F_{15}CON(C_2H_5)CH_2CH_2OCOC(CH_3)=CH_2$
$C_8F_{17}(CH_2)_{11}OCOC(CH_3)=CH_2$

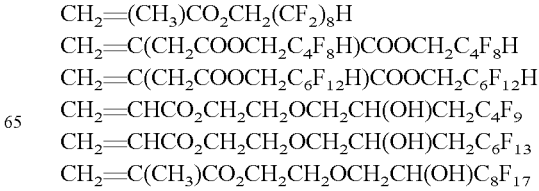

$(CF_3)_2CFO(CH_2)_5OCOCH=CH_2$
$C_2F_5(OCF_2CF_2)_5OCF_2CF_2CON(CH_3)CH_2CH_2OCOCH=CH_2$
$C_8F_{17}SO_2N(CH_2CH_2OCOCH=CH_2)_2$
$C_8F_{17}SO_2N(CH_3)(CH_2)_{10}OCOCH_2CH=CH_2$
$C_8F_{17}SO_2N(C_2H_5)CH_2CH_2OCOCH=CHCOOC_4H_9$
$C_6F_{13}SO_2N(CH_3)CH_2CH_2OCOCH=CH_2$
$C_8F_{17}SO_2NHCH_2CH_2SO_2CH=CH_2$
$CF_2=CF_2$
$CH_2=CHCO_2CH_2(CF_2)_4H$
$CH_2=CHCO_2CH_2(CF_2)_6H$
$CH_2=CHCO_2CH_2(CF_2)_8H$
$CH_2=C(CH_3)CO_2CH_2(CF_2)_4H$
$CH_2=C(CH_3)CO_2CH_2(CF_2)_6H$
$CH_2=(CH_3)CO_2CH_2(CF_2)_8H$
$CH_2=C(CH_2COOCH_2C_4F_8H)COOCH_2C_4F_8H$
$CH_2=C(CH_2COOCH_2C_6F_{12}H)COOCH_2C_6F_{12}H$
$CH_2=CHCO_2CH_2CH_2OCH_2CH(OH)CH_2C_4F_9$
$CH_2=CHCO_2CH_2CH_2OCH_2CH(OH)CH_2C_6F_{13}$
$CH_2=C(CH_3)CO_2CH_2CH_2OCH_2CH(OH)C_8F_{17}$

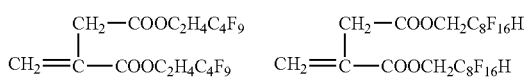

In embodiments, a macromonomer having a structural unit derived from the first monomer may be employed as the first monomer itself.

Such a macromonomer may be produced by any known methods. Examples of such known methods include a method including subjecting the first monomer to radical polymerization with thioglycolic acid, 2-mercapto ethanol and the like in the presence of an initiator, and incorporating an unsaturated bond into one terminal end of the radical polymerized-resultant by reacting the resultant with glycidyl methacrylate, isocyanato ethyl methacrylate and the like.

The number-average molecular weight of the macromonomer is preferably 10,000 or less, and more preferably 5,000 or less.

A content of the structural unit derived from the first monomer in the fluorine-containing copolymer is preferably 5% by mass or more, and more preferably 20% by mass or more, with respect to the total amount of the fluorine-containing copolymer in view of the ejection reliability and the offset resistance.

Second Monomer

The fluorine-containing copolymer preferably contains at least one structural unit derived from a second monomer having a hydrophilic group and an ethylenically unsaturated bond. Examples of the hydrophilic group include an anionic group which can form a salt, a cationic group which can form a salt, and a nonionic group. In embodiments, the second monomer may have two or more hydrophilic groups. In embodiments, the second monomer may be an amphoteric monomer which has both an anionic group and a cationic group.

Examples of the monomer having an anionic group include an unsaturated carboxylic acid monomer, an unsaturated sulfonic acid monomer, and an unsaturated phosphoric acid monomer. Examples of the unsaturated carboxylic acid monomer include: monocarboxylic acid monomers such as acrylic acid, methacrylic acid, or crotonic acid, dicarboxylic acid monomers such as itaconic acid, maleic acid, or fumaric acid, and their anhydrides and their monoalkyl esters; and vinyl ethers having a carboxy group such as carboxyethyl vinylether or carboxypropyl vinylether.

Examples of the unsaturated sulfonic acid monomer include styrene sulfonic acid, 2-acrylamido-2-methylpropane sulfonic acid, 3-sulfopropyl methacrylic acid ester, bis-(3-sulfopropyl)-itaconic acid ester, and the like, and salts thereof, and also sulfuric acid monoester of 2-hydroxyethyl methacrylic acid and a salt thereof.

Examples of the unsaturated phosphoric acid monomer include vinyl phosphonic acid, vinyl phosphate, acid phosphoxyethyl methacrylate, acid phosphoxypropyl methacrylate, bis(methacryloyloxyethyl) phosphate, diphenyl-2-(methacryloyloxyethyl) phosphate, diphenyl-2-(methacryloyloxy)ethyl phosphate, dibutyl-2-(methacryloyloxyethyl) phosphate, dibutyl-2-(acryloyloxyethyl) phosphate, and dioctyl-2-(methacryloyloxyethyl) phosphate.

Examples of the cationic monomer include unsaturated tert-amine-containing monomer, unsaturated ammonium salt-containing monomer, and the like. Specifically, examples include mono-vinyl pyridines such as vinyl pyridine, 2-methyl-5-vinyl pyridine, 2-ethyl-5-vinyl pyridine, and the like; styrenes having a dialkyl amino group such as N,N-dimethylamino styrene, and N,N-dimethylamino methyl styrene; esters having a dialkylamino group of acrylic acid or methacrylic acid such as N,N-dimethylaminoethyl methacrylate, N,N-dimethylaminoethyl acrylate, N,N-diethylaminoethyl methacrylate, N,N-diethylaminoethyl acrylate, N,N-dimethylaminopropyl methacrylate, N,N-dimethylaminopropyl acrylate, N,N-diethylaminopropyl methacrylate, N,N-diethylaminopropyl acrylate; vinyl ethers having a dialkylamino group such as 2-dimethylaminoethyl vinyl ether; acrylamides or methacrylamides having a dialkylamino group such as N—(N',N'-dimethylaminoethyl)methacrylamide, N—(N',N'-dimethylaminoethyl)acrylamide, N—(N',N'-diethylaminoethyl)methacrylamide, N—(N',N'-diethylaminoethyl)acrylamide, N—(N',N'-dimethylaminopropyl)methacrylamide, N—(N',N'-dimethylaminopropyl)acrylamide, N—(N',N'-diethylaminopropyl)methacrylamide, N—(N',N'-diethylaminopropyl)acrylamide; and quaternized compounds thereof by well-known quaternizing agent such as a halogenated alkyl compound (with an alkyl group having 1 to 18 carbon atoms, and as halogen, chloride, bromide, or iodide), halogenated benzyl compounds such as, for example, benzyl chloride, or benzyl bromide, alkyl esters (with an alkyl group having 1 to 18 carbon atoms) of alkylsulfonic acid or arylsulfonic acid such as methane sulfonic acid, benzenesulfonic acid, or toluenesulfonic acid, and dialkylsulfate (with alkyl groups having 1 to 4 carbon atoms).

Examples of the amphoteric monomer include N-(3-sulfopropyl)-N-methachloryl oxyethyl-N,N-dimethyl ammonium betaine, N-(3-sulfopropyl)-N-methachlorylamide propyl-N,N-dimethyl ammonium betaine, and 1-(3-sulfupropyl)-2-vinylpyridinium betaine.

Examples of the nonionic monomer include unsaturated polyoxyethylene oxide monomers and unsaturated polyoxypropylene oxide monomers.

Examples of the nonionic monomer include esters of unsaturated carboxylic acid monomers and poly(alkylene oxide) adduct of polyoxyalkylene glycol or lower alcohols having 1 to 4 carbon atoms, and reaction products of allylglycidyl ether or glycidyl ether of unsaturated carboxylic acid monomer with poly(oxyalkylene oxide) adduct of polyoxyalkylene glycol or lower alcohols having 1 to 4 carbon atoms. Specific examples include the compounds shown below. Herein, n represents an integer of from 2 to 100.

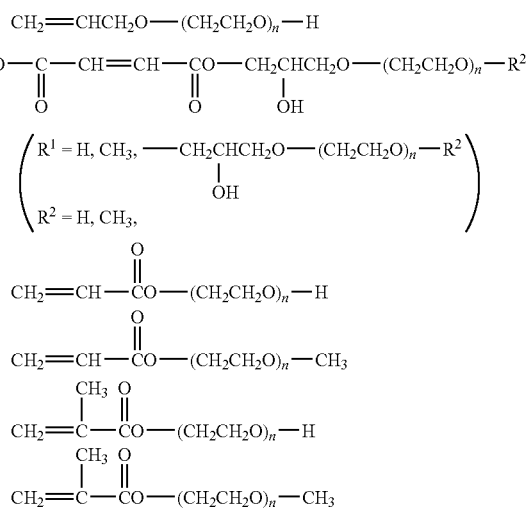

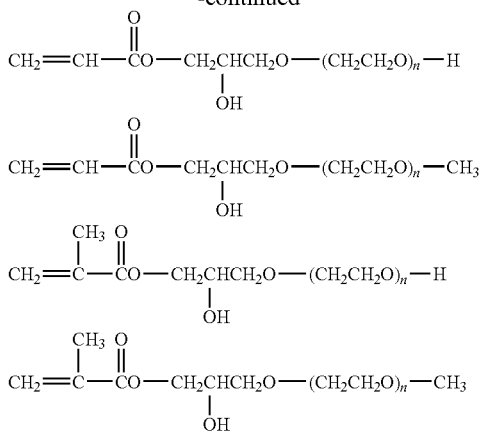

In embodiments in which the fluorine-containing copolymer is essentially formed of the structural unit derived from the first monomer and the structural unit derived from the second monomer, the fluorine-containing copolymer preferably contains 80% by mass to 99.9% by mass of the structural unit derived from the first monomer and 0.1% by mass to 20% by mass of the structural unit derived from the second monomer, and more preferably contains 85% by mass to 99% by mass of the structural unit derived from the first monomer and 1% by mass to 15% by mass of the structural unit derived from the second monomer.

The fluorine-containing copolymer preferably further contains a third monomer in addition to the first monomer and the second monomer. There is no particular limitation to the third monomer as long as it is copolymerizable with the first monomer and the second monomer. Examples of the third monomer include a monomer having an ethylenically unsaturated bond, such as (meth)acrylates, vinyl esters, vinyl ethers, maleic acid ethers, fumalic acid ethers, or α-olefins.

Specific examples of the third monomer include: vinyl esters such as vinyl acetate, vinyl propionate, vinyl butyrate, vinyl pivalate, vinyl capronate, vinyl laurate, vinyl versate, vinyl cyclohexene carboxylate, or the like; vinyl ethers such as methyl vinyl ether, ethyl vinyl ether, n-propyl vinyl ether, isopropyl vinyl ether, n-butyl vinyl ether, isobutyl vinyl ether, t-butyl vinyl ether, n-pentyl vinyl ether, n-hexyl vinyl ether, n-octyl vinyl ether, 2-ethylhexyl vinyl ether, cyclohexyl vinyl ether, lauryl vinyl ether, or the like; mono-olefins such as ethylene, propyrene, or the like; maleic acid ethers such as dimethyl maleate, diethyl maleate, dioctyl maleate, or the like; di-olefins such as butadiene, isoprene, or the like; allyl compounds such as allyl acetate, or the like; methacrylate esters such as methyl methacrylate, ethyl methacrylate, n-butyl methacrylate, isobutyl methacrylate, 2-ethylhexyl methacrylate, n-octyl methacrylate, decyl methacrylate, dodecyl methacrylate, or the like; styrene monomers such as styrene, vinyl toluene, or the like; monomers such as acrylonitrile; and alicyclic monomers such as monomers having an isobornyl group or dicyclopentanyl group.

In embodiments, a macromonomer having a structural unit derived from the third monomer may be employed as the first monomer itself.

The content of the structural unit derived from the third monomer in the fluorine-containing copolymer is preferably from 0.5% by mass to 95% by mass, and more preferably from 5% by mass to 80% by mass, based on the total amount of the fluorine-containing copolymer.

In embodiments in which the fluorine-containing copolymer is essentially formed of the structural unit derived from the first monomer, the structural unit derived from the second monomer and the structural unit derived from the third monomer, the fluorine-containing copolymer preferably contains 5% by mass to 99% by mass of the structural unit derived from the first monomer, 0.1% by mass to 20% by mass of the structural unit derived from the second monomer, and 0.5% by mass to 94.9% by mass of the structural unit derived from the third monomer, and more preferably contains 10% by mass to 80% by mass of the structural unit derived from the first monomer, 1% by mass to 10% by mass of the structural unit derived from the second monomer, and 19% by mass to 89% by mass of the structural unit derived from the third monomer.

The fluorine-containing copolymer may be a random copolymer, a graft copolymer or a block copolymer. The molecular weight of the fluorine-containing copolymer is, in terms of weight average molecular weight, preferably in a range of from 5,000 to 10,000,000, more preferably from 5,000 to 1,000,000, and further preferably from 5,000 to 100,000.

Specific examples of the formulation of monomers which are used for forming the fluorine-containing copolymer are shown below, although the invention is not limited thereby. The ratio shown in each parenthesis indicates a ratio of respective monomers in terms of mass.

FL-1: methylmethacrylate/1H,1H,2H,2H-heptadecafluorodecyl methacrylate/2-acrylamide2-methyl propanesulfonic acid (50.8/41.2/8.0)

FL-2: methyl methacrylate/1H,1H,2H,2H-heptadecafluorodecyl methacrylate/acrylic acid (49.8/48.2/2.0)

FL-3: ethyl methacrylate/1H,1H,2H,2H-heptadecafluorodecylmethacrylate/acrylic acid (85.0/7.0/8.0)

FL-4: lauryl methacrylate/1H,1H,2H,2H-heptadecafluorodecyl methacrylate/dimethylaminoethyl methacrylate (22.0/70.0/8.0)

FL-5: methylmethacrylate/1H,1H,2H,2H-heptadecafluorodecyl methacrylate/acrylic acid/glycidyl methacrylate (50.8/36.2/8.0/5.0)

FL-6: (1H,1H,2H,2H-heptadecafluorodecyl)vinyl ether/4,4,4-trifluorobutyl vinyl ether/maleic anhydride (72.0/14.0/14.0)

FL-7: tetrafluoroethylene/propylene/acrylic acid (25.0/25.0/50.0)

FL-8

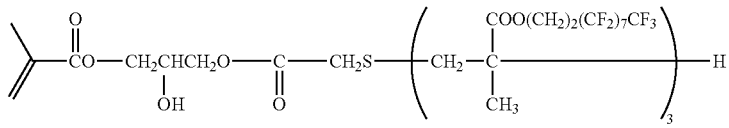

-continued

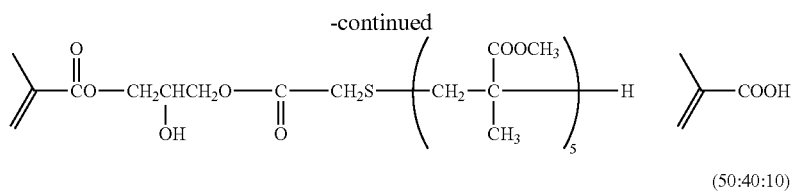

(50:40:10)

FL-9: methylmethacrylate/n-butyl acrylate/2,2,2-trifluoroethyl methacrylate/N-methylol acrylamide/acrylic acid (46.0/46.0/5.0/1.0/2.0)

FL-10: methyl methacrylate/n-butyl acrylate/2,2,2-trifluoroethyl methacrylate/N-methylol acrylamide/acrylic acid (42.2/44.8/10.0/1.0/2.0)

FL-11: methylmethacrylate/n-butyl acrylate/2,2,2-trifluoroethyl methacrylate/N-methylol acrylamide/acrylic acid (35.5/41.5/20.0/1.0/2.0)

FL-12: methylmethacrylate/2,2,2-trifluoroethylmethacrylate/N-methylol acrylamide/2-ethyl hexylacrylate/acrylic acid (19.4/40.0/1.0/37.6/2.0)

FL-13: 2-(perfluorohexyl)ethyl acrylate/n-butyl methacrylate/acrylic acid (5.0/90.0/5.0)

FL-14: 2-(perfluorohexyl)ethyl acrylate/n-butyl methacrylate/t-butyl methacrylate/acrylic acid (15.0/60.0/20.0/5.0)

FL-15: 2-(perfluorohexyl)ethyl acrylate/n-butyl methacrylate/2-hydroxyethyl methacrylate/acrylic acid (25.0/65.0/5.0/5.0)

FL-16: 2-(perfluorohexyl)ethyl acrylate/n-butyl methacrylate/2-hydroxyethyl methacrylate/acrylic acid (20.0/70.0/5.0/5.0)

FL-17: 2-(perfluorohexyl)ethyl acrylate/n-butyl methacrylate/2-hydroxyethyl methacrylate/acrylic acid (5.0/83.0/10.0/2.0)

FL-18: 2-(perfluorohexyl)ethyl acrylate/n-butyl methacrylate/2-hydroxyethyl methacrylate/acrylic acid (10.0/78.0/10.0/2.0)

FL-19: 2-(perfluorohexyl)ethyl acrylate/2-(perfluorodecyl)ethyl acrylate/2-(perfluorododecyl)ethyl acrylate (33.0/34.0/33.0)

There is no limitation on a method of producing the fluorine-containing copolymer employed in the invention. Examples include: a method including copolymerizing a monomer mixture containing the monomers by known polymerization methods such as a solution-polymerization method or a bulk-polymerization method. Among the polymerization methods, the solution-polymerization method is preferable, and the solution-polymerization method using an organic solvent is more preferable, from the viewpoint of the offset resistance and droplet jetting stability when the fluorine-containing copolymer is employed in the ink composition.

From the viewpoint of the ejection reliability and an aggregation rate, it is preferable that the fluorine-containing copolymer employed in the invention is a copolymer synthesized in an organic solvent and having a carboxyl group (, preferably the acid value thereof being 20 to 100), and the fluorine-containing copolymer is prepared as an aqueous polymer dispersion in which the carboxyl group of the copolymer is partially or thoroughly neutralized and water serves as a continuous phase. More specifically, the production of the fluorine-containing copolymer employed in the invention preferably has synthesizing a fluorine-containing copolymer in an organic solvent and dispersing the polymer to form an aqueous dispersion in which at least a part of the carboxyl group of the copolymer is neutralized.

The dispersing preferably includes the following processes (1) and (2).

Process (1): Stirring a mixture containing a fluorine-containing copolymer, an organic solvent, a neutralizer, and an aqueous medium; and Process (2): Removing the organic solvent from the mixture.

The process (1) preferably includes obtaining a dispersion by dissolving the fluorine-containing copolymer in an organic solvent first, gradually adding a neutralizer and an aqueous medium, and mixing and stirring the mixture. The addition of the neutralizer and the aqueous medium in a solution of the fluorine-containing copolymer in which the copolymer has been dissolved into an organic solvent may enable to provide fluorine-containing copolymer having particle diameters which may enable to achieve higher storage stability without strong shearing force.

There is no limitation on a stirring method of the mixture, and generally-used mixing and stirring devices or, as required, dispersers such as an ultrasonic disperser or a high voltage homogenizer can be used.

Preferable examples of the organic solvent include an alcohol solvent, a ketone solvent, and an ether solvent.

Examples of the alcohol solvent include isopropyl alcohol, n-butanol, t-butanol, and ethanol. Examples of the ketone solvent include acetone, methyl ethyl ketone, diethyl ketone, and methyl isobutyl ketone. Examples of the ether solvent include dibutyl ether and dioxane. Among the solvents, the ketone solvent such as methyl ethyl ketone, and the alcohol solvent such as isopropyl alcohol are preferable. It is also preferable to use isopropyl alcohol and methyl ethyl ketone in combination in view of making the change in polarity at the time of phase inversion from an oil phase to a water phase being moderate. By using the solvents in combination, a fluorine-containing copolymer that can be free from coagulation-precipitation or fusion of particles and can have high dispersion stability and fine particle diameters can be obtained.

The neutralizer is used for forming an emulsion state or a dispersion state in which the dissociative group is partially or thoroughly neutralized and the fluorine-containing copolymer is stabilized in water. Examples of the neutralizer which can be used when the fluorine-containing copolymer employed in the invention has an anionic dissociative group (e.g., a carboxyl group) as the dissociative group include basic compounds such as organic amine compounds, ammonia, or hydroxides of alkali metals. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethylethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and tri-isopropanolamine. Examples of the hydroxides of alkali metals include lithium hydroxide, sodium hydroxide, and potassium hydroxide. Among the above, from the viewpoint of stabilization of dispersion of the fluorine-containing copolymer employed in the invention in water, sodium hydroxide, potassium hydroxide, triethylamine, and triethanolamine are preferable.

The content of the basic compound is preferably from 5 mol % to 120 mol %, more preferably from 10 mol % to 110 mol %, and still more preferably from 15 mol % to 100 mol %, with respect to 100 mol % of the dissociative groups. Stabilization of the dispersion of the particles in water can be demonstrated when the content of the basic compound is adjusted to 5 mol % or more, can be more demonstrated when the content of the basic compound is adjusted to 10 mol % or more, and can be further demonstrated when the content of the basic compound is adjusted to 15 mol % or more. Reduction in a content of the water-soluble components can be achieved when the content of the basic compound is adjusted to 120 mol % or lower, can be more achieved when the content of the basic compound is adjusted to 110 mol % or lower, and can be further achieved when the content of the basic compound is adjusted to 100 mol % or lower.

In the process (2), an aqueous dispersion of the fluorine-containing copolymer can be obtained by inverting a phase of the dispersion, which has been obtained in the process (1), to a water phase by common procedures such as vacuum distillation distilling off the organic solvent from. The thus-obtained aqueous dispersion is substantially free of the organic solvent. The amount of the organic solvent contained in the aqueous dispersion is preferably 0.2% by mass or lower, and more preferably 0.1% by mass or lower.

The average particle diameter of the polymer particles of the fluorine-containing copolymer is, in terms of a volume average particle diameter, preferably in the range of from 10 nm to 400 nm, more preferably in the range of from 10 nm to 200 nm, still more preferably in the range of from 10 nm to 100 nm, and particularly preferably in the range of from 10 nm to 50 nm. When the average particle diameter is 10 nm or more, production suitability of the polymer particles may be increased. When the average particle diameter is 400 nm or lower, the storage stability may be increased. The particle size distribution of the polymer particles is not particularly limited. The polymer particles may have either a broad particle size distribution or a monodisperse particle size distribution. Two or more water-insoluble particles may be used in combination as a mixture.

The average particle diameter and particle size distribution of the particles of the fluorine-containing copolymer can be determined by measuring the volume average particle diameter by dynamic light scattering using a nanotruck particle size distribution meter UPA-EX150 (trade name, manufactured by Nikkiso Co., Ltd.).

The glass transition temperature (Tg) of the fluorine-containing copolymer is preferably from 20° C. to 200° C., more preferably from 30° C. to 180° C., and further preferably from 40° C. to 170° C., from the viewpoint of storage stability of the ink composition.

From the viewpoint of the offset resistance and nozzle maintenance property, the content of the fluorine-containing copolymer in the ink composition is preferably from 1% by mass to 30% by mass, and more preferably 5% by mass to 15% by mass, with respect to the total amount of the ink composition.

The fluorine-containing copolymer can be used singly or in a form of a mixture of two or more thereof.

Pigment

The ink composition employed in the invention contains at least one pigment. The pigment may be contained in the ink composition in a form of a pigment dispersion. Any conventionally-known pigments may be used as the pigment in the invention without particular limitation.

The type of the pigment is not particularly limited, and known organic pigments and known inorganic pigments may be used. Examples of the pigment include polycyclic pigments such as an azo lake, an azo pigment, a phthalocyanine pigment, a perylene pigment, a perynone pigment, an anthraquinone pigment, a quinacridone pigment, a dioxadine pigment, a diketopyrrolopyrrole pigment, a thioindigo pigment, an isoindolinone pigment and a quinophthalone pigment; dye lakes such as basic dye lakes and acidic dye lakes; organic pigments such as a nitro pigment, a nitroso pigment, aniline black and a daylight fluorescent pigment; and inorganic pigments such as titanium oxide, iron oxide and carbon black. Pigments that can be dispersed in an aqueous phase may be used even if they are not described in the Color Index. Examples of usable pigments further include: pigments obtained by subjecting the above-described pigments to surface treatment with a surfactant, a polymer dispersant or the like; and grafted carbon. Among these pigments, an azo pigment, a phthalocyanine pigment, an anthraquinone pigment, a quinacridone pigment and a carbon black pigment are preferable.

Specific examples of the pigment include those described in paragraphs [0142] to of JP-A No. 2007-100071.

Dispersant

The pigment is preferably dispersed in a solvent by a dispersant. The dispersant may be a polymer dispersant or a low-molecular-weight surfactant dispersant. The polymer dispersant may be either a water-soluble dispersant or a water-insoluble dispersant. The "water-insoluble dispersant" refers to a dispersant that the amount of the dispersant soluble in 100 g of water at 25° C. is at most 10 g when the dispersant is subjected to drying at 105° C. for 2 hours and then dissolved in the water.

With the low-molecular-weight surfactant dispersant (also referred to as "low-molecular-weight dispersant" in the following) an organic pigment can be stably dispersed in an aqueous medium, while maintaining the viscosity of the ink at a low level. The low-molecular-weight dispersant referred herein has a molecular weight of 2,000 or less. The molecular weight of the low-molecular-weight dispersant is preferably from 100 to 2,000, and more preferably from 200 to 2,000.

The low-molecular-weight dispersant has a structure containing a hydrophilic group and a hydrophobic group. The number of the hydrophilic group and the number of the hydrophobic group in one molecule of the low-molecular-weight dispersant are each independently one or more, and the low-molecular-weight dispersant may have plural kinds of hydrophilic group and/or plural kinds of hydrophobic group. In embodiments, the low-molecular-weight dispersant may have a linking group which links the hydrophilic group and the hydrophobic group.

Examples of the hydrophilic group include an anionic group, a cationic group, a nonionic group, and a betaine group in which the above groups are combined.

The anionic group is not particularly limited so long as the group has a negative charge. The anionic group is preferably a phosphoric acid group, a phosphonic acid group, a phosphinic acid group, a sulfuric acid group, a sulfonic acid group, a sulfinic acid group or a carboxylic acid group, more preferably a phosphoric acid group or a carboxylic acid group, and still more preferably a carboxylic acid group.

The cationic group is not particularly limited so long as the group has a positive charge. The cationic group is preferably an organic cationic substituent, more preferably a cationic group containing a nitrogen or phosphorus atom, and still more preferably a cationic group containing a nitrogen atom. Among those, the cationic group is particularly preferably a pyridinium cation or an ammonium cation.

The nonionic group is not particularly limited so long as the group has no negative or positive charge. Examples of the nonionic group include polyalkylene oxide, polyglycerin and a sugar unit of a certain kind.

The hydrophilic group is preferably an anionic group from the viewpoint of dispersion stability and aggregation properties of a pigment.

When the low-molecular-weight dispersant has an anionic hydrophilic group, its pKa is preferably 3 or more in terms of promoting aggregation reaction upon contacting with an acidic reaction liquid. The pKa of the low-molecular-weight dispersant as used herein is a value experimentally obtained based on a titration curve that is obtained by titrating a 1 mmol/liter solution of the low-molecular-weight dispersant dissolved in a tetrahydrofuran/water solution (THF:water=3:2, V/V), with an acid or aqueous alkaline solution.

Theoretically, when the pKa of a low-molecular-weight dispersant is 3 or more, 50% or more of anionic groups are in a non-dissociation state when the ink composition is contacted with a reaction liquid having a pH of about 3.5 or less. Therefore, water solubility of the low-molecular-weight dispersant is remarkably decreased, and an aggregation reaction occurs, namely, aggregation reactivity is improved. From this viewpoint, the low-molecular-weight dispersant preferably has a carboxylic group as an anionic group.

The hydrophobic group may have, for example, any of a hydrocarbon structure, a fluorocarbon structure, or a silicone structure. A hydrocarbon structure is particularly preferable. The hydrophobic group may have a straight-chain structure or a branched structure. The hydrophobic group may have a single-chain structure or a chain structure having two or more chains. When the hydrophobic group has a structure having two or more chains, the structure may have plural kinds of hydrophobic group.

The hydrophobic group is preferably a hydrocarbon group having 2 to 24 carbon atoms, more preferably a hydrocarbon group having 4 to 24 carbon atoms, and further preferably a hydrocarbon group having 6 to 20 carbon atoms.

When the polymer dispersant is a water-soluble dispersant, examples thereof include a hydrophilic polymer compound. Examples of natural hydrophilic polymer compounds include plant polymers such as gum arabic, gum tragacanth, guar gum, gum karaya, locust bean gum, arabinogalactan, pectin and quince seed starch, algae polymers such as alginic acid, carrageenan and agar, animal polymers such as gelatin, casein, albumin and collagen, and microbial polymers such as xanthene gum and dextran.

Examples of hydrophilic polymer compounds obtained by chemically modifying natural raw materials include cellulose polymers such as methyl cellulose, ethyl cellulose, hydroxyethyl cellulose, hydroxypropyl cellulose and carboxymethyl cellulose, starch polymers such as sodium starch glycolate (sodium salt of starch glycolate), and sodium starch phosphate (sodium salt of starch phosphate[ester]), and algae polymers such as propylene glycol alginate.

Examples of synthetic hydrophilic polymer compounds include vinyl polymers such as polyvinyl alcohol, polyvinyl pyrrolidone and polyvinyl methyl ether; acrylic resins such as polyacrylamide, polyacrylic acid and alkali metal salts thereof, or water-soluble styrene acrylic resin; water-soluble styrene maleic acid resin; water-soluble vinylnaphthalene acrylic resin; water-soluble vinylnaphthalene maleic acid resins; polyvinyl pyrrolidone; polyvinyl alcohol; alkali metal salts of formalin condensates of β-naphthalene sulfonic acid; polymer compounds having, at a side chain, a salt of a cationic functional group such as a quaternary ammonium group or an amino group.

Among those, a polymer compound containing a carboxyl group is preferable from the viewpoint of dispersion stability and aggregation properties of pigment. Polymer compounds containing a carboxyl group such as the following are particularly preferable: acrylic resins such as water-soluble styrene acrylic resins; water-soluble styrene maleic acid resins; water-soluble vinylnaphthalene acrylic resins; and water-soluble vinylnaphthalene maleic acid resins.

Examples of water-insoluble dispersants among the polymer dispersants include polymers each having both hydrophilic and hydrophobic moieties, such as styrene-(meth)acrylic acid copolymers, styrene-(meth)acrylic acid-(meth)acrylic ester copolymers, (meth)acrylic ester-(meth)acrylic acid copolymers, polyethylene glycol (meth)acrylate-(meth)acrylic acid copolymers, and styrene-maleic acid copolymers.

The weight average molecular weight of the polymer dispersant is preferably from 3,000 to 200,000, more preferably from 5,000 to 100,000, further preferably from 5,000 to 80,000, and yet further preferably from 10,000 to 60,000.

The ratio of an amount of the pigment to an amount of the dispersant (pigment:dispersant) in the ink composition in terms of mass is preferably in a range of from 1:0.06 to 1:3, more preferably in a range of from 1:0.125 to 1:2, and still more preferably in a range of from 1:0.125 to 1:1.5.

The ink composition may further contain a dye as long as the effects of the invention are not impaired.

In embodiments, the dye may be in a form of a water-insoluble colorant, in which a dye is retained on a water-insoluble carrier. The dye may be selected from known dyes without particular restrictions, and the dyes described in, for example, JP-A Nos. 2001-115066, 2001-335714, and 2002-249677 may be used suitably in the invention. The carrier is not particularly limited as long as the carrier is insoluble in water or hardly-soluble in water, and the carrier may be selected from an inorganic material, an organic material, or a composite material thereof. Specifically, the carriers described in, for example, JP-A Nos. 2001-181549 and 2007-169418 may be used suitably in the invention.

The carrier retaining the dye (namely, a water-insoluble colorant) may be used in the form of an aqueous dispersion containing a dispersant. Examples of the dispersant are similar to those of the dispersant used for dispersing the pigment.

The ink composition preferably contains a pigment and a dispersant, more preferably contains an organic pigment and a polymer dispersant, and particularly preferably contains an organic pigment and a polymer dispersant containing a carboxyl group, in consideration of the rubbing resistance and the aggregation property.

From the viewpoint of the aggregation property of the ink composition, the combination of the pigment and the dispersant preferably forms a water-insoluble organic pigment in which the pigment is covered with a polymer dispersant containing a carboxyl group.

From the viewpoint of the aggregation property, it is preferable that the acid value of the polymer dispersant is larger than the acid value of the fluorine-containing copolymer.

The average particle diameter of the pigment is preferably from 10 nm to 200 nm, more preferably from 10 nm to 150 nm, and still more preferably from 10 nm to 100 nm When the average particle diameter is 200 nm or less, color reproducibility of the ink composition may be excellent, and droplet jetting properties of the ink composition subjected to The inkjet recording method may be excellent. When the average particle diameter is 10 nm or more, light-fastness of images formed from the composition may be excellent. The particle size distribution of the pigment is not particularly limited, and may be a broad particle size distribution or a monodispersed particle size distribution. In embodiments, a mixture of two or more pigments, each of which having a monodispersed particle size distribution, may be used.

The volume average particle diameter and particle size distribution of the polymer particles are values which can be obtained by measuring particle diameters by a dynamic light scattering method, using a NANOTRAC particle size distribution measuring instrument UPA-EX150 (trade name, manufactured by NIKKISO Co., Ltd.).

The pigment may be used singly or in combination of two or more thereof. From the viewpoint of image density, the content of pigment in the ink composition is preferably from 1% by mass to 25% by mass, more preferably from 2% by mass to 20% by mass, still more preferably from 5% by mass to 20% by mass, and particularly preferably from 5% by mass to 15% by mass, with respect to the total amount of the ink composition.

Water-Soluble Organic Solvent

The ink composition employed in the invention contains water and at least one hydrophilic organic solvent. The inclusion of the water-soluble organic solvent in the ink composition with the fluorine-containing copolymer particles may facilitate to keep the minimum filming temperature of the polymer particles being low in the ink composition so that the ejection stability of the ink composition and the like can be favorable. The "water-soluble organic solvent" refers to that the amount of the water-soluble organic solvent which can be dissolved in water at 20° C. is 1% by mass or more of the amount of the water.

Examples of the water-soluble organic solvent which forms the ink composition and is preferable from the viewpoint of the suppression of curl of a printed matter in a high humidity environment include alkyleneoxy alcohol and alkyleneoxy alkyl ether.

The alkyleneoxy alcohol is preferably a propyleneoxy alcohol. Examples of the propyleneoxy alcohol include SUN-NIX GP250 and SUNNIX GP400 (both trade names, manufactured by Sanyo Chemical Industries, Ltd.).

The alkyleneoxy alkyl ether is preferably an ethyleneoxyalkyl ether having an alkyl moiety of 1 to 4 carbon atoms or a propyleneoxyalkyl ether having an alkyl moiety of 1 to 4 carbon atoms. Examples of the alkyleneoxyalkyl ether include ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether.

In preferable embodiments, particles of the fluorine-containing copolymer employed in the invention are self-dispersing polymer particles, and the water-soluble organic solvent is a combination of propyleneoxy alcohol and one or both of ethyleneoxy alkyl ether (the alkyl moiety thereof having 1 to 4 carbon atoms) and propyleneoxy alkyl ether (the alkyl moiety thereof having 1 to 4 carbon atoms). In more preferable embodiments, particles of the fluorine-containing copolymer employed in the invention are self-dispersing polymer particles containing a water insoluble polymer having a water-soluble structural unit and a structural unit derived from an aromatic group-containing monomer, and the water-soluble organic solvent is a combination of propyleneoxy alcohol and one or both of ethyleneoxy alkyl ether (the alkyl moiety thereof having 1 to 4 carbon atoms) and propyleneoxy alkyl ether (the alkyl moiety thereof having 1 to 4 carbon atoms).

In addition to the water-soluble organic solvent, if necessary, any other organic solvent may be added for the purpose of suppressing drying, accelerating penetration, regulating viscosity, and the like.

A certain organic solvent used as an anti-drying agent may effectively suppress nozzle clogging, which could otherwise be caused by the ink dried in the ink ejection port in ejecting the ink composition by The inkjet recording method.

For the suppression of drying, a water-soluble organic solvent having a vapor pressure lower than that of water is preferably used. Examples of the water-soluble organic solvent suitable for the suppression of drying include: polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane; heterocyclic compounds such as 2-pyrrolidone, N-methyl-2-pyrrolidone, 1,3-dimethyl-2-imidazolidinone, and N-ethylmorpholine; sulfur-containing compounds such as sulfolane, dimethylsulfoxide and 3-sulfolene; polyfunctional compounds such as diacetone alcohol and diethanolamine; and urea derivatives. In particular, polyhydric alcohols such as glycerin and diethylene glycol are preferred.

In order to accelerate the penetration, an organic solvent may be used for better penetration of the ink composition into recording media. Examples of the organic solvent suitable for penetration acceleration include alcohols such as ethanol, isopropanol, butanol, and 1,2-hexanediol, sodium lauryl sulfate, sodium oleate, and nonionic surfactants.

Besides, a water-soluble organic solvent may also be used to control viscosity. Examples of the water-soluble organic solvent that may be used to control viscosity include alcohols (e.g., methanol, ethanol and propanol), amines (e.g., ethanolamine, diethanolamine, triethanolamine, ethylenediamine, and diethylenetriamine), and other polar solvents (e.g., formamide, N,N-dimethylformamide, N,N-dimethylacetamide, dimethylsulfoxide, sulfolane, 2-pyrrolidone, acetonitrile, and acetone).

Water

The ink composition used in the invention contains water. There is no particular limitation to the content of water in the ink composition. The content of water may be from 10% by mass to 99% by mass, more preferably from 30%% by mass to 80% by mass, and still more preferably 50% by mass to 70% by mass with respect to the total amount of the ink composition.

Polymer Particles

In addition to the fluorine-containing copolymer, the ink composition employed in the invention may preferably contain polymer particles formed from at least one resin. The inclusion of the polymer particles may improve the fixing property of the ink composition.

Examples of the resin of the polymer particles which may be contained in the ink composition include particles of acrylic resins, vinyl acetate resins, styrene-butadiene resins, vinyl chloride resins, acryl-styrene resins, butadiene resins, styrene resins, crosslinked acrylic resins, crosslinked styrene resins, benzoguanamine resins, phenolic resins, silicone resins, epoxy resins, urethane resins, paraffin resins, and fluorine resins. Preferable examples thereof include particles of acrylic resins, acryl-styrene resins, styrene resins, crosslinked and acrylic resins, crosslinked styrene resins.

The polymer particles are preferably self-dispersible polymer particles.

The weight average molecular weight of the polymer particles is preferably from 10,000 to 200,000, and more preferably from 100,000 to 200,000.

The average particle diameter of the resin fine particle is preferably from 10 nm to 1 nm, more preferably from 10 nm to 200 nm, even more preferably from 20 nm to 100 nm, and particularly preferably from 20 nm to 50 nm.

The glass transition temperature (Tg) of the polymer particles is preferably 30° C. or higher, more preferably 40° C. or higher, and even more preferably 50° C. or higher.

The addition amount of the polymer particles is preferably from 0.5% by mass to 20% by mass, more preferably from 3% by mass to 20% by mass, and even more preferably from 5% by mass to 15% by mass with respect to the total amount of the ink composition.

The particle diameter distribution of the polymer particles is not particularly limited, and may be a broad particle diameter distribution or a monodispersed particle diameter distribution. In embodiments, a mixture of two or more kinds of polymer fine particles each having a monodispersed particle diameter distribution may be used.

Other Components

The ink composition of the invention may further contain other components (additives) in accordance with necessity. Examples of such other components include known additives such as an anti-fading, an emulsion stabilizer, a permeation accelerator, an ultraviolet absorber, a preservative, an antifungal agent, a pH regulator, a surface tension regulator, a defoaming agent, a viscosity adjusting agent, a dispersant, a dispersion stabilizer, an anti-rust agent or a chelating agent.

Examples of the ultraviolet absorber include a benzotriazole ultraviolet absorber, a benzophenone ultraviolet absorber, a salicylate ultraviolet absorber, a cyanoacrylate ultraviolet absorber, a nickel complex salt ultraviolet absorber, a cinnamic acid compound ultraviolet absorber, a triazine compound ultraviolet absorber, and optical whitening agents such as a stilbene compound or a benzoxazole compound.

Various organic organic anti-fading agents and metal complex anti-fading agents can be used as the anti-fading agent. Examples of the organic anti-fading agent include hydroquinones, alkoxyphenols, dialkoxyphenols, phenols, anilines, amines, indans, chromanes, alkoxy anilines, and heterocyclic compounds. Examples of the metal complex include a nickel complex and a zinc complex.

Examples of the antifungal agent include sodium dehydroacetate, sodium benzoate, sodium pyridinethione-1-oxide, ethyl p-hydroxybenzoate, 1,2-benzisothiazoline-3-one, and salts thereof. The content of antifungal agent in the ink composition is preferably from 0.02% by mass to 1.00% by mass.

A neutralizer (an organic base or an inorganic alkali) may be used as the pH regulator. In order to improve the storage stability of the ink composition, the pH regulator is preferably added so that the ink composition can have a pH of from 6 to 10, more preferably from 7 to 10.

Examples of the surface tension regulator include nonionic surfactants, cationic surfactants, anionic surfactants, and betaine type surfactants.

For smooth ejection in The inkjet recording method, the amount of addition of the surface tension regulator is preferably such that the surface tension of the ink composition can be adjusted in the range of from 20 mN/m to 60 mN/m, more preferably from 20 mN/m to 45 mN/m, further preferably from 25 mN/m to 40 mN/m.

The surface tension of the ink composition may be measured by a plate method using AUTOMATIC SURFACE TENSIOMETER CBVP-Z (trade name, manufactured by Kyowa Interface Science Co., LTD.) under the temperature condition of 25° C.

Preferable examples of the surfactant include hydrocarbon anionic surfactants such as fatty acid salts, alkyl sulfate ester salts, alkyl benzenesulfonates, alkyl naphthalenesulfonates, dialkyl sulfosuccinates, alkyl phosphate ester salts, naphthalenesulfonic acid-formalin condensates, and polyoxyethylene alkyl sulfate ester salts; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkylamines, glycerin fatty acid esters, and oxyethylene-oxypropylene block copolymers. Acetylene polyoxyethylene oxide surfactants SURFYNOLs (trade name, manufactured by Air Products & Chemicals, Inc.) and OLFINE E1010 (trade name, manufactured by Nissin Chemical Industry Co., Ltd., surfactant) are also preferably used. Amine oxide type amphoteric surfactants such as N,N-dimethyl-N-alkylamine oxide are also preferrable.

The surfactants listed in pages 37 to 38 of JP-A No. 59-157636 and Research Disclosure No. 308119 (1989) may also be used.

Fluorocarbon (alkyl fluoride type) surfactants or silicone surfactants as described in JP-A Nos. 2003-322926, 2004-325707 and 2004-309806 may be used to improve the rubbing resistance.

The surface tension regulator may also be used as a defoaming agent, and fluorine compounds, silicone compounds, and chelating agents such as EDTA may also be used.

The viscosity of the ink composition that is to be ejected and applied by The inkjet recording method is preferably in the range of from 1 mPa·s to 30 mPa·s, more preferably from 1 mPa·s to 20 mPa·s, further preferably from 2 mPa·s to 15 mPa·s, and particularly preferably from 2 mPa·s to 10 mPa·s, from the viewpoints of the ejection stability and the aggregation rate upon contact between the ink composition and a treatment liquid.

The viscosity of the ink composition may be measured by, for example, using a Brookfield viscometer.

Recording Medium

In The inkjet recording method of the invention, the image is recorded on a recording medium.

The recording medium to be used may be, but not limited to, a sheet of general printing paper containing cellulose as a main component, such as so-called high-quality paper, coated paper, or art paper, for use in general offset printing. When general printing paper containing cellulose as a main component is used in image recording by a conventional inkjet method with a water-based ink, the ink may be absorbed in the paper and dried relatively slowly, so that colorants in the ink may be likely to migrate after being provided on the paper, which may easily lead to image quality deterioration. According to The inkjet recording method of the invention, however, the migration of the colorants may be suppressed so that high-quality image recording with good color density and hue may be achieved.

Generally commercially available recording media may be used as the recording medium, and examples thereof include wood free paper (A) such as OK PRINCE HIGH-QUALITY (trade name, manufactured by Oji paper Co., Ltd.), SHIORAI (trade name, manufactured by Nippon Paper Industries Co., Ltd. and NEW NPI HIGH-QUALITY (trade name, manufactured by Nippon Paper Industries Co., Ltd.); lightly coated paper such as OK EVER LIGHT COAT (trade name, manufactured by Oji paper Co., Ltd.) and AURORA S (trade name, manufactured by Nippon Paper Industries Co., Ltd.); lightweight coated paper (A3) such as OK COAT L (trade name, manufactured by Oji paper Co., Ltd.) and AURORA L (trade name, manufactured by Nippon Paper Industries Co., Ltd.); coated paper (A2, B2) such as OK TOP COAT+ (trade name, manufactured by Oji paper Co., Ltd.) and AURORA Coat (trade name, manufactured by Nippon Paper Industries Co., Ltd.); and art paper (A1) such as OK KANAFUJI+ (trade name, manufactured by Oji paper Co., Ltd.) and TOKUBISHI ART (trade name, manufactured by Mitsubishi Papers Mills Ltd.). Various types of photo paper for inkjet recording may also be used.

In view of obtaining larger colorant migration-suppressing effect and higher quality images with better color intensity and hue comparing to the conventional ones, the recording medium preferably has a water absorption coefficient Ka of from $0.05$ $mL/m^2 \cdot ms^{1/2}$ to $0.5$ $mL/m^2 \cdot ms^{1/2}$, more preferably from $0.1$ $mL/m^2 \cdot ms^{1/2}$ to $0.4$ $mL/m^2 \cdot ms^{1/2}$, and further preferably from $0.2$ $mL/m^2 \cdot MS^{1/2}$ to $0.3$ $mL/m^2 \cdot ms^{1/2}$.

The water absorption coefficient Ka has the same meaning as that described in JAPAN TAPPI Paper and Pulp Test Method No. 51: 2000 (issued by Japan Technical Association of the Pulp and Paper Industry). Specifically, the absorption coefficient Ka may be determined by calculating the difference between the amounts of transfer of water at a contact time of 100 ms and a contact time of 900 ms each measured using an automatic scanning liquid absorption meter (trade name: KM500WIN, manufactured by Kumagai Riki Kogyo Co., Ltd.).

Among the recording medium, a coated paper sheet for use in general offset printing is particularly preferred. Coated paper is produced by applying a coating material to the surface of non-surface-treated general wood-free paper, neutralized paper or the like having cellulose as a main component thereof so that a coating layer can be formed thereon. Coated paper may be more likely to form images having insufficient qualities such as poor image glossiness or poor rubbing resistance when it is used in conventional inkjet recording methods using water-based inks. However, The inkjet recording method of the invention may provide images with good glossiness and rubbing resistance and may reduce uneven glossiness even when the images are formed on coated paper. Preferable examples of the coated paper include one having a base paper and a coating layer containing kaolin and/or calcium bicarbonate. Specific examples thereof include art paper, coated paper, lightweight coated paper, and lightly coated paper.

Inkjet Recording Method

An operation system of The inkjet recording method of one aspect of the invention is not particularly limited and may be of any known system. Examples thereof include: a charge control system of ejecting an ink utilizing an electrostatic attraction force; a drop-on-demand system of utilizing a vibration pressure of a piezo element (pressure pulse system); an acoustic ink-jet system of converting electric signals into acoustic beams, irradiating them to an ink, and ejecting the ink utilizing a radiation pressure; and a thermal ink-jet system known as BUBBLEJET®, that includes utilizing pressure from bubbles resulted by heating an ink.

Examples of the ink ejection mode used in The inkjet recording method include: a mode which includes jetting a number of ink droplets of low concentration, a so-called "photo-ink" each in a small volume; a mode which includes using plural inks of a substantially identical hue and of different concentrations to improve an image quality; and a mode which includes using a colorless and transparent ink.

The inkjet head used in The inkjet recording method may be either that for the on-demand system or that fir the continuous system.

Specific examples of The inkjet head classified in terms of the ejection system include those for an electric-mechanical conversion system (for example, single cavity type, double cavity type, vender type, piston type, share mode type, shared wall type, etc.), those for an electric-thermal conversion system (for example, thermal ink-jet type, BUBBLEJET (registered trade mark) type, etc.), those for an electrostatic suction system (for example, electric field control type, slit jet type, etc.), and those for an electric discharge system (for example, spark jet type, etc.), and any of these may be used in the invention.

There are no particular limitation to ink nozzles and the like used for recording by The inkjet recording method, and properly selected ones may be used depending on the purpose.

Examples of The inkjet head include a shuttle system of performing recording using a serial head of a short length while scanning the head in the width direction of a recording medium and a line system using a line head in which recording elements are arranged corresponding to all the regions of one side of a recording medium. In the line system, image recording can be performed throughout the surface of the recording medium by scanning the recording medium in the direction orthogonal to the arrangement direction of the recording elements, and conveyance systems for scanning the short length head, such as a carriage, become unnecessary. Moreover, complicated scanning control of the movement of the carriage and the recording medium becomes unnecessary, and only the recording medium transfers. Thus, compared with the shuttle system, a recording rate can be increased when The inkjet recording method of the invention employs the line system. In embodiments, the ejection reliability and the nozzle maintenance property may be highly improved when The inkjet recording method of the invention is applied to the line system in which dummy jet is not generally performed, although The inkjet recording method of the invention can employ both of the shuttle system and the line system.

When The inkjet recording method of the invention employs the line system, recording can be preferably carried out using not only one ink composition but two or more ink compositions by adjusting the interval between the ejection (droplet ejection) of the ink composition (the n-th color ($n \geq 1$), e.g., a second color) to be ejected earlier and the ejection of the ink composition (the n+1 color, e.g., a 3rd color) to be ejected following the ink composition ejected earlier to 1 second or less in the aggregate formation process in the invention. When the ejection interval is adjusted to 1 second or less in the line system, images having excellent rubbing resistance and reduced development of blocking may be obtained under higher speed recording more than before while suppressing blur or color mixture of colors occurring due to interference between ink droplets. Moreover, images excellent in a hue and drawing properties (reproducibility of thin lines or fine portions in images) may be obtained.

In view of forming high definition images, the amount of an ink droplet ejected from an ink-jet head is preferably from 0.5 pl to 6 pl (picoliters), more preferably from 1 pl to 5 pl, and further preferably from 2 pl to 4 pl.

Drying

The inkjet recording method of the invention include performing, after the applying of the ink composition to the recording medium to form an image, drying the image on the recording medium. The drying process may facilitate to fix the image onto the recording medium and may improve rubbing resistance of the formed image.

There is no particular limitation to the drying as long as it removes at least a part of the water-soluble organic solvent and water in the ink composition applied on the recording medium, and may employ any conventionally-know methods. Specific examples of the methods include non-contact drying methods such as: a method including heating by a heating element such as a nichrome wire heater; a method including supplying warmed air or hot air; or a method including heating by a halogen lamp, an infrared lamp or the like.

Specifically, for example, the method including heating by a heating element may perform heating the image at from 40° C. to 80° C. for from 0.5 seconds to 5 seconds. The heating may be performed plural times with different temperatures.

Heat-Fixing

The inkjet recording method of the invention include performing, after the drying of the image on the recording medium, heat-fixing the image on the recording medium by contacting a heating member with the image, that is typically performed by contacting the heating member the surface of the recording medium on which the image ahs been formed. The heat-fixing process may facilitate to fix the image onto the recording medium and may improve rubbing resistance of the formed image.

The heating is preferably performed at a temperature higher than the minimum filming temperature (MFT) of the polymer particles in the image when the organic solvent contained in the ink composition functions as a film formation auxiliary agent. When the image is heated to a temperature higher than the minimum filming temperature (MFT), the ink composition forms a film to thereby strengthen the image. The heating temperature is preferably the MFT plus 10° C. or higher. Specifically, the heating temperature is preferably in the range of 40° C. to 150° C., more preferably 50° C. to 100° C., and still more preferably 60° C. to 90° C.

When pressure is applied together with the heat, the pressure is preferably in the range of from 0.1 MPa to 3.0 MPa, more preferably from 0.1 MPa to 1.0 MPa, and further preferably from 0.1 MPa to 0.5 MPa, from the viewpoint of surface smoothing.

Examples of the method of bringing the image surface into contact with the heating member include, but not particularly limited thereto, a method including pressing a hot plate against the image-bearing surface of the recording medium, and a method including passing the recording medium through a nip formed between a pair of rolls, a pair of heating and pressurizing belts, or a combination of a heating-and-pressurizing belt and a holding roller in which the heating-and-pressurizing belt is disposed at the side of the image bearing surface of the recording medium and the holding roller is arranged the opposite side.

When the image is fixed by heating-and-pressurizing, the nip time may be preferably 1 millisecond to 10 seconds, more preferably 2 milliseconds to 1 second, and still more preferably 4 milliseconds to 100 milliseconds. A preferable nip width may be 0.1 mm to 100 mm, more preferably 0.5 mm to 50 mm, and still more preferably 1 mm to 10 mm.

The heating and pressurizing roll may be a metal roll or may be a roll having a metal core and an elastic material coating layer provided around the metal core and may further have a surface layer (also referred to as a "release layer") if necessary. When the heating and pressurizing roll is the roll having a metal core, the metal core may be a cylindrical member made of iron, aluminum, SUS, or the like, and at least part of the surface of the metal core is preferably covered with a coating layer. In particular, the coating layer is preferably made of a silicone resin or a fluororesin having the releasing property. The metal core of one of the heating-and-pressurizing rolls preferably contains a heating element. The recording medium may be allowed to pass between the rolls so that heating and pressurizing are performed at the same time. If necessary, this heating-and-pressurizing may be performed with two heating rolls to pass the recording medium therebetween. Preferable examples of the heating element include a halogen lamp heater, a ceramic heater, and a nichrome wire heater.

The belt substrate to form the heating-and-pressurizing belt for use in the heating-and-pressurizing apparatus is preferably a seamless electroformed nickel substrate, and the thickness of the substrate is preferably from 10 μm to 100 μm. Besides nickel, aluminum, iron, polyethylene, or the like may also be used to form the belt substrate. When a silicone resin or a fluororesin is used to form a layer on a surface of the belt, the layer preferably has a thickness of from 1 μm to 50 μm, and more preferably from 10 μm to 30 μm.

The pressure (nip pressure) may be attained, for example, by selecting a resilient member having a tension (such as a spring) and disposing the resilient member on both ends of the heating and pressurizing rolls such that a desired nip pressure is obtained with taking the nip gap into consideration.

The transporting speed of the recording medium when the heating-and-pressurizing roll or the heating-and-pressurizing belt is used is preferably in a range of from 200 mm/sec to 700 mm/sec, more preferably from 300 mm/sec to 650 mm/sec and, further preferably from 400 mm/sec to 600 mm/sec.

Treatment Liquid-Applying

The inkjet recording method of one aspect of the invention may preferably further include applying a treatment liquid to the recording medium, in which the treatment liquid is capable of forming an aggregation upon contacting with the ink composition. In embodiments which include the use of the treatment liquid, dispersed particles in the ink composition such as the pigment coagulate upon the contact of the ink composition and the treatment liquid applied to the recording medium, and an image is fixed onto the recording medium thereby. The inclusion of the treatment liquid-applying in The inkjet recording method may facilitate to perform The inkjet recording method at high-speed, and images excellent in a hue and drawing properties (reproducibility of thin lines or fine portions in images) may be obtained even when The inkjet recording method is performed at high-speed.

Treatment Liquid

The treatment liquid which can be employed in the inkjet recording method of the invention is not particularly limited as long as it is capable of enhancing forming an aggregation upon contacting with the ink composition. In embodiments, the treatment liquid preferably contains at least an aggregating component which can coagulate dispersed particles in the ink composition such as the pigment, and may further contain other components.

Examples of the treatment liquid include a liquid capable of forming an aggregate by changing the pH of the ink composition. The pH of the treatment liquid (at 25° C.±1° C.) is preferably from 1 to 6, more preferably from 1.2 to 5, and further preferably from 1.5 to 4, from the viewpoint of the aggregation rate of the ink composition. In this case, the pH of the ink composition (at 25° C.±1° C.) used in the ejection is preferably from 7.5 to 9.5, and more preferably from 8 to 9.0.

In embodiments, the condition that the pH of the ink composition (at 25° C.) is from 7.5 to 9.5 and the pH of the treatment liquid (at 25° C.) is from 1.5 to 3 may be preferable from the viewpoint of the image density, the resolution and increasing of The inkjet recording speed.

The aggregating component may be used singly or in a form of a mixture of two or more thereof.

The treatment liquid may be prepared using at least one acidic compound as the aggregating component. Examples of the acidic compound include compounds having a phosphate group, a phosphonate group, a phosphinate group, a sulfate group, a sulfonate group, a sulfinate group, or a carboxy group, and salts thereof (such as polyvalent metal salts). In view of the aggregation rate of the ink composition, compounds having a phosphate group or a carboxy group are more preferable, and compounds having a carboxy group are further preferable.

The carboxy group-containing compound is preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, ortho-phosphoric acid, pyrrolidonecarboxylic acid, pyronecarboxylic acid, pyrrolecarboxylic acid, furancarboxylic acid, pyridinecarboxylic acid, coumaric acid, thiophenecarboxylic acid, nicotinic acid, derivatives of these compounds, or salts thereof (such as polyvalent metal salts). These compounds may be used alone or in a combination of two or more of them.

The treatment liquid in the invention may further contain a water-based solvent (such as water) in addition to the acidic compound and the like.

The content of the acidic compound in the treatment liquid is preferably 5% by mass to 95% by mass, more preferably 10% by mass to 80% by mass, still more preferably 15% by mass to 50% by mass, and particularly preferably 18% by mass to 30%, based on the total mass of the treatment liquid from the viewpoint of the aggregation effect.

Preferable examples of the treatment liquid that may improve the high speed aggregation property include a treatment liquid including a polyvalent metal salt. Examples of the polyvalent metal salt include salts of alkaline earth metals belonging to group 2 of the periodic table (for example, magnesium and calcium), salts of a transition metal belonging to group 3 of the periodic table (for example, lanthanum), salts of a cation of a metal belonging to group 13 of the periodic table (for example, aluminum), and salts of a lanthanide (for example, neodium). As the metal salts, carboxylic acid salts (such as, salts of formic acid, salts of acetic acid, and salts of benzoic acid), nitric acid salts, chlorides, and thiocyanic acid salts are preferable, and calcium salt or magnesium salt of a carboxylic acid (such as salts of formic acid, salts of acetic acid, and salts of benzoic acid), calcium salt of nitric acid or magnesium salt of nitric acid, calcium chloride, magnesium chloride, and calcium salt of thiocyanic acid and magnesium salt of thiocyanic acid are more preferable.

The content of a salt of the metal salt in the treatment liquid is preferably 1% by mass to 10% by mass, more preferably 1.5% by mass to 7% by mass, and still more preferably 2% by mass to 6% by mass, from the viewpoint of the aggregation effect.

The treatment liquid may be prepared using at least one cationic organic compound as the aggregating component. Examples of the cationic organic compound include cationic polymers such as poly(vinylpyridine) salts, polyalkylaminoethyl acrylate, polyaklylaminoethyl methacrylate, poly(vinylimidazole), polyethyleneimine, polybiguanide, polyguanide, and polyallyamine, and derivatives thereof.

The weight average molecular weight of the cationic polymer is preferably smaller from the viewpoint of the viscosity of the treatment liquid. When the treatment liquid is applied on a recording medium by an ink jet system, the weight average molecular weight thereof is preferably in the range of 1,000 to 500,000, more preferably in the range of 1,500 to 200,000, and still more preferably in the range of 2,000 to 100,000. The weight average molecular weight of 1000 or more may be advantageous from the viewpoint of an aggregation rate and the weight average molecular weight of 500,000 or lower may be advantageous in terms of ejection reliability.

The cationic organic compound is preferably a primary, secondary or tertiary amine salt compound. Examples of such an amine salt compound include cationic compounds such as hydrochlorides or acetates (e.g., laurylamine, coconut amine, stearylamine, and rosin amine), quaternary ammonium salt compounds (e.g., lauryltrimethylammonium chloride, cetyltrimethylammonium chloride, lauryldimethylbenzylammonium chloride, benzyltributylammonium chloride, and benzalkonium chloride), pyridinium salt compounds (e.g., cetylpyridinium chloride and cetylpyridinium bromide), imidazoline cationic compounds (e.g., 2-heptadecenyl-hydroxyethylimidazoline), ethylene oxide adducts of higher alkylamine (e.g., dihydroxyethylstearylamine); and amphoteric surfactants capable of being cationic in the desired pH range, such as amino acid amphoteric surfactants, $R-NH-CH_2CH_2-COOH$ compounds, carboxylic acid salt amphoteric surfactants (e.g., stearyl dimethyl betaine and lauryl dihydroxyethyl betaine), sulfate amphoteric surfactants, sulfonic acid amphoteric surfactants, or phosphate amphoteric surfactants.

In particular, cationic organic compounds having a valency of two or more are preferable.

The content of the cationic organic compound in the treatment liquid is preferably 1% by mass to 50% by mass, and more preferably 2% by mass to 30% by mass from the viewpoint of aggregation effects.

Among the above, preferable examples of the aggregating component include carboxylic acids having a valency of two or more or cationic organic compounds having a valency of two or more, from the viewpoints of aggregation properties and rubbing resistance of images.

In addition to the aggregating component, the treatment liquid that may be employed in the invention may further contain a water-soluble organic solvent, and may further contain any other components, as long as it does not impair the effect of the invention.

Details of the water-soluble organic solvent and other components are similar to those optionally contained in the ink composition.

From the viewpoint of the aggregation rate of the ink composition, the viscosity of the treatment liquid is preferably in the range of from 1 mPa·s to 30 mPa·s, more preferably from 1 mPa·s to 20 mPa·s, further preferably from 2 mPa·s to 15 mPa·s, and particularly preferably from 2 mPa·s to 10 mPa·s. The viscosity may be measured using VISCOMETER TV-22 (trade name, manufactured by TOKI SANGYO CO., LTD.) under 20° C.

From the viewpoint of the aggregation rate of the ink composition, the surface tension of the treatment liquid is preferably from 20 mN/m to 60 mN/m, more preferably from 20 mN/m to 45 mN/m, and further preferably from 25 mN/m to 40 mN/m. The surface tension may be measured using AUTOMATIC SURFACE TENSIOMETER CBVP-Z (trade name, manufactured by Kyowa Interface Science Co., LTD.) under 25° C.

The treatment liquid can be applied by a known method, such as a coating method, an inkjet recording method, or a dip coating method. The coating method can be carried out using a known coating method employing a bar coater, an extrusion die coater, an air doctor coater, a bread coater, a rod coater, a knife coater, a squeeze coater, a reverse roll coater, or the like. The details of The inkjet recording method are as described above.

The treatment liquid applying may be performed before or after the ink composition applying.

In preferable embodiments, the ink composition applying is performed after applying the treatment liquid to the recording liquid. More specifically, in preferable embodiments, a treatment liquid for aggregating a colorant (preferably a pigment) in the ink composition is applied on the recording medium in advance before applying the ink composition, and the ink composition is supplied in such a manner as to contact with the treatment liquid applied on the recording medium to thereby form an image. This may enable to increase The inkjet recording speed, and images with high density and high resolution may be obtained even when The inkjet recording is performed at high speed.

The application amount of the treatment liquid is preferably such that the aggregating component (e.g., a carboxylic acid having a valency of two or more or a cationic organic compound having a valency of two or more) can be applied in an amount of 0.1 g/m$^2$ or more, although it is not particularly limited as long as the ink composition can be aggregated. In particular, the aggregating component is preferably applied in an amount of from 0.1 g/m$^2$ to 1.0 g/m$^2$, more preferably from 0.2 g/m$^2$ to 0.8 g/m$^2$. When the amount of application of the aggregating component is 0.1 g/m$^2$ or more, the aggregation reaction can proceed well. When it is 1.0 g/m$^2$ or less, the glossiness will not become too high, which is preferable.

In the invention, it is preferable to perform the ink composition applying after the treatment liquid applying, and further perform heat-drying by heating the treatment liquid on the recording medium after applying the treatment liquid onto the recording medium but before applying the ink composition. When the treatment liquid is dried by heating in advance before the ink composition application, ink coloring properties, such as suppression of blur, become favorable, and thus visible images having a favorable color density and a favorable hue can be recorded.

The drying by heating may be carried out by known heating measures, such as a heater, or known air blowing measures, such as a dryer, or by using the measures in combination. Examples of the heating method include a method for supplying heat with a heater or the like from the surface of the recording medium onto which the treatment liquid is applied and the opposite side, a method for applying warmed air or hot air to the surface of the recording medium onto which the treatment liquid is applied, and a heating method using an infrared heater or the like. The heating methods may be used in combination for heating.

EXAMPLES

The invention will be described in detail by way of examples but the invention is not limited thereto. Unless otherwise specified, "part" and "percent (%)" are based on mass.

The weight average molecular weight was measured by gel permeation chromatography (GPC). The GPC was performed by using HLC-8220GPC (trade name, manufactured by Tosoh Corporation), 3 pieces of columns TSKGEL SUPER HZM-H, TSKGEL SUPER HZ4000, and TSK GEL SUPERHZ 2000 (trade name, manufactured by Tosoh Corporation) connected in series, and tetrahydrofuran (THF) as an eluate. Further, the measurement was performed by using a refractive index detector under the conditions at a sample concentration of 0.45% by mass, a flow rate of 0.35 mL/min, a sample ejection amount of 10 mL, and a measuring temperature of 40° C. A calibration curve was prepared based on eight samples of "F-40", "F-20", "F-4", "F-1", "A-5000", "A-2500", "A-1000", and "N-PROPYLBENZENE" of STANDARD SAMPLE TSK STANDARD, POLYSTYRENE manufactured by Tosoh Corporation.

Example 1

Preparation of Ink Composition
Synthesis of Polymer Dispersant P-1

88 g of methyl ethyl ketone was put in a 1000 mL three-necked flask equipped with a stirrer and a cooling tube and heated to 72° C. in a nitrogen atmosphere, to which a solution in which 0.85 g of dimethyl 2,2'-azobisisobutyrate, 60 g of benzyl methacrylate, 10 g of methacrylic acid, and 30 g of methyl methacrylate were dissolved in 50 g of methyl ethyl ketone was added dropwise over 3 hr. After completing the dropwise addition and further allowing the mixture to react for 1 hr, a solution in which 0.42 g of dimethyl 2,2'-azobisisobutyrate was dissolved in 2 g of methyl ethyl ketone was added, and the temperature of the mixture was elevated to 78° C. and the mixture was heated at 78° C. for 4 hr. The obtained reaction solution was re-precipitated twice in a great excess of hexane and a precipitated resin was dried, thereby obtaining 96 g of a polymer dispersant P-1.

The composition of the obtained polymer dispersant P-1 was confirmed by $^1$H-NMR and the weight average molecular weight (Mw) determined by GPC was 44,600. Further, when an acid value was determined according to the method described in JIS standards (JIS K0070:1992, the disclosure of which is incorporated by reference herein), the obtained resin was revealed having an acid value of 65.2 mgKOH/g.

Preparation of Pigment Dispersion C 10 parts of pigment blue 15:3 (trade name: PHTHALOCYANINE BLUE A220, manufactured by Dainichiseika Color & Chemicals Mfg. Co., Ltd; cyan pigment), 5 parts of the polymer dispersant P-1, 42 parts of methyl ethyl ketone, 5.5 parts of an aqueous 1N NaOH solution, and 87.2 parts of ion exchange water were mixed, and the mixture was dispersed for 2 hours to 6 hours by means of a bead mill using zirconia beads having a diameter of 0.1 mm.

From the obtained dispersion, methyl ethyl ketone was removed at 55° C. under reduced pressure, and further water was partially removed. Then, the resultant was subjected to centrifugal treatment using a 50 mL centrifuging tube by means of a HIGH-SPEED CENTRIFUGAL COOLER 7550 (trade name, manufactured by Kubota Corporation) at 8000 rpm for 30 minutes, thereby collecting the supernatant to remove the precipitate. Thereafter, the pigment concentration was determined from the absorbance spectrum, thereby obtaining a dispersion C (cyan dispersion C), that is a dispersion of resin-coated pigment particles (pigment coated with a polymer dispersant) and has a pigment concentration of 10.2% by mass.

Preparation of Pigment Dispersion M

A pigment dispersion M (a magenta dispersion liquid M), that is a dispersion of resin-coated pigment particles which are coated with a polymer dispersant, was prepared in the same manner as the preparation of the pigment dispersion C, except that pigment red 122 (trade name: CROMOPHTAL JET MAGENTA DMQ, manufactured by Ciba Specialty Chemicals; magenta pigment) was used in place of the pigment blue 15:3 (cyan pigment).

Preparation of Pigment Dispersion Y

A pigment dispersion Y (a yellow dispersion liquid Y), that is a dispersion of resin-coated pigment particles which are coated with a polymer dispersant, was prepared in the same manner as the preparation of the pigment dispersion C, except that pigment yellow 74 (trade name: IRGALITE YELLOW GS, manufactured by Ciba Specialty Chemicals; yellow pigment) was used in place of the pigment blue 15:3.

Preparation of Pigment Dispersion K

A pigment dispersion K (a black dispersion liquid K), that is a dispersion of resin-coated pigment particles which are coated with a polymer dispersant, was prepared in the same manner as the preparation of the pigment dispersion C, except that carbon black (trade name: NIPEX160-IQ, manufactured by Degussa; black pigment) was used in place of the pigment blue 15:3.

Preparation of Fluorine Atom-Containing Copolymer
Preparation of Fluorine-Containing Copolymer FL-1

64 parts of isopropyl alcohol, 4 parts of ion exchange water, 14.8 parts of methyl methacrylate, 41.2 parts of 1H,1H,2H, FL-1: methylmethacrylate/1H,1H,2H,2H-heptadecafluorodecyl methacrylate/2-acrylamide2-methyl propanesulfonic acid (50.8/41.2/8.0)

Preparation of Fluorine-Containing Copolymers FL-4, FL-8, FL-11, and FL-19

An aqueous dispersion of a fluorine-containing copolymer FL-4, an aqueous dispersion of a fluorine-containing copolymer FL-8, an aqueous dispersion of a fluorine-containing copolymer FL-11, and an aqueous dispersion of a fluorine-containing copolymer FL-19 were respectively prepared in the same manner as the aqueous dispersion of a fluorine-containing copolymer FL-1, except that the kinds and amounts of the monomer used for the preparation were changed as shown below.

FL-4: lauryl methacrylate/1H,1H,2H,2H-heptadecafluorodecyl methacrylate/dimethylaminoethyl methacrylate (22.0/70.0/8.0)

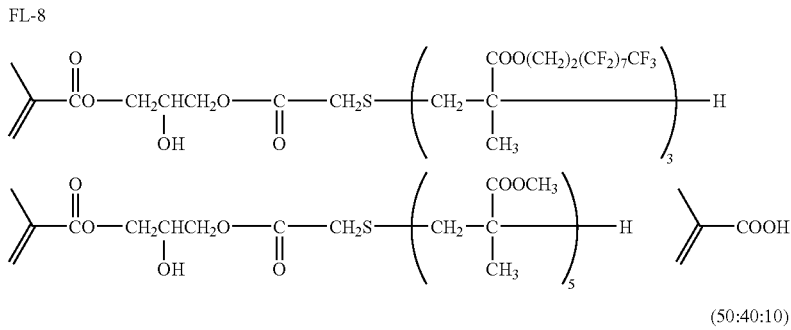

2H-heptadecafluorodecyl methacrylate, and 8 parts of 2-acrylamide-2-methylpropane sulfonic acid were charged to a reactor equipped with a stirrer, a refluxing cooler, a dropping funnel, a thermometer, and a nitrogen introduction tube, and a nitrogen gas was flown thereto to remove oxygen dissolved in the raw material mixture.

36 parts of isopropyl alcohol, 36 parts of methylmethacrylate and 0.07 parts of azobisisobutyronitrile from which dissolved oxygen was removed were charged in the dropping funnel. After heating the reactor to 83±3° C., 0.13 parts of azobisisobutyronitrile dissolved in 2 parts of methyl ethyl ketone were added, and monomers for forming a fluorine-containing copolymer FL-1 were dropped from the dropping funnel conforming to the consumption rate of methyl methacrylate. After completing the dropping of the monomers, 0.2 parts of azobisisobutyronitrile dissolved in 3 parts of methyl ethyl ketone were added, reaction was continued for further 2 hours, 0.1 parts of azobisisobutyronitrile dissolved in 2 parts of methyl ethyl ketone were added again, and reaction was continued again for 6 hours, to obtain a homogeneous copolymer solution.

Then, after neutralizing the copolymer solution by adding 15.5 parts of an aqueous solution of 10 mass % of sodium hydroxide thereto and successively adding 300 parts of ion exchange water thereto, methyl ethyl ketone was removed from the resultant under a reduced pressure to obtain an aqueous dispersion of the fluorine-containing copolymer FL-1.

The monomers used to form the fluorine-containing copolymer FL-1 is as follows. The ratio shown in the parenthesis indicates a ratio of respective monomers in terms of mass.

FL-11: methylmethacrylate/n-butyl acrylate/2,2,2-trifluoroethyl methacrylate/N-methylol acrylamide/acrylic acid (35.5/41.5/20.0/1.0/2.0)

FL-19: 2-(perfluorohexyl)ethyl acrylate/2-(perfluorodecyl)ethyl acrylate/2-(perfluorododecyl)ethyl acrylate (33.0/34.0/33.0)

Preparation of Fluorine-Containing Copolymer FL-7

450 parts of methyl ethyl ketone and 5 parts of acrylic acid from which dissolved oxygen was removed were charged in a one liter volume autoclave made of stainless steel equipped with a stirrer, and gases in the inside were replaced with nitrogen. Then, after replacement with tetrafluoroethylene, a monomer mixture containing propylene and tetrafluoroethylene (molar ratio (%) of propylene/tetrafluoroethylene=60/40) was injected and the internal pressure was increased to 4.9 MPa.

Temperature was elevated after starting stirring and, when the internal temperature reached 70° C., 0.9 parts of benzoyl peroxide dissolved in 10 parts of methyl ethyl ketone were injected and, after injecting the monomer mixture having the above formulation such that the internal pressure was increased to 13.7 MPa, 145 parts of acrylic acid were injected over 8 hours. During reaction, the internal temperature was kept at 75° C., each of the monomers was supplemented conforming to the consumption rate for propylene and tetrafluoroethylene, to keep the internal pressure in a range from 12.7 MPa to 13.7 MPa. Further, 0.9 parts of benzoyl peroxide dissolved in 10 parts of methyl ethyl ketone were added three hours after and six hours after and, after reaction for 12 hours, the autoclave was cooled and volatile materials were evaporated. The consumption amount of the monomer mixture during the process was about 150 parts.

The formulation of the obtained fluorine-containing copolymer was determined by NMR and turned out as being tetrafluoroethylene/propylene/acrylic acid=25/25/50 (mass %).

Then, 100 parts of the obtained fluorine-containing copolymer (solid content: 38.5 parts) were taken and, after adding 27 parts of triethylamine and 160 parts of ion exchange water thereto, methyl ethyl ketone was removed under a reduced pressure, to obtain an aqueous dispersion of a fluorine-containing copolymer FL-7.

Preparation of Copolymer B-01

In a 2 L three-neck flask equipped with a stirrer, a thermometer, a reflux condenser tube, and a nitrogen gas introducing tube, 360.0 g of methyl ethyl ketone was placed, and heated to 75° C. A mixture solution of 180 g of methyl methacrylate, 32.4 g of methoxyethyl acrylate, 126.0 g of benzyl methacrylate, 21.6 g of methacrylic acid, 72 g of methyl ethyl ketone, and 1.44 g of V-601 (trade name, manufactured by Wako Pure Chemical Industries, Ltd.) was added dropwise thereto at a constant velocity such that the addition could be completed in 2 hours. After the addition was completed, a solution of 0.72 g of V-601 and 36.0 g of methyl ethyl ketone was added and stirred at 75° C. for 2 hours. A solution of 0.72 g of V-601 and 36.0 g of methyl ethyl ketone was further added and stirred at 75° C. for 2 hours. The mixture was then heated to 85° C. and further stirred for 2 hours, so that a resin solution of methyl methacrylate/methoxyethyl acrylate/benzyl methacrylate/methacrylic acid (50/9/35/6 in mass ratio) copolymer was obtained.

The weight average molecular weight (Mw) of the resulting copolymer was 66,000 (measured by gel permeation chromatography (GPC) and determined in terms of a polystyrene-equivalent molecular weight).

Next, 668.3 g of the obtained resin solution was weighed out, 388.3 g of isopropanol and 145.7 mL of aqueous 1 mol/L NaOH solution were added thereto, and the temperature inside the reaction vessel was elevated to 80° C. Next, 720.1 g of distilled water was added dropwise at a rate of 20 mL/min for aqueous dispersion. Thereafter, the resultant was held at a temperature in the reaction vessel of 80° C. for 2 hours under atmospheric pressure, then at 85° C. for 2 hours, and then 90° C. for 2 hours. Then, the pressure in the reactor was reduced, and isopropanol, methyl ethyl ketone, and distilled water were distilled off in the total amount of 913.7 g, thereby obtaining an aqueous dispersion of copolymer B-01 having a solid content of 28.0%.

Preparation of Copolymer BH-1

8.1 g of an emulsifier (trade name: PIONIN A-43S, manufactured by Takemoto Oil and Fat Co) and 236.0 g of distilled water were charged to a one liter three-necked flask equipped with a stirrer and a tubular reflux cooler and stirred under a nitrogen gas stream with heating at 70° C. 6.2 g of styrene, 3.5 g of n-butyl acrylate, 0.3 g of acrylic acid, 1.0 g of ammonium persulfate, and 40 g of distilled water were added and, after stirring for 30 min, a monomer solution comprising 117.8 g of styrene, 66.5 g of n-butyl acrylate, and 5.7 g of acrylic acid was dropped at an equal speed such that dropping was completed in 2 hours. After the completion of dropping, an aqueous solution comprising 0.5 g of ammonium persulfate and 20 g of distilled water was added and, after stirring at 70° C. for 4 hours, temperature was elevated to 85° C. and stirring was continued for further 2 hours. By cooling and filtering the reaction solution, an aqueous solution of styrene/butyl acrylate/acrylic acid (=62/35/3) copolymer BH-1 was obtained.

Preparation of Ink Composition

Ink compositions were prepared by mixing the components to achieve the compositions described below, using the aqueous dispersion of the fluorine-containing copolymer FL-1 and the dispersions of resin-coated pigment particles (the cyan pigment dispersion C, the magenta pigment dispersion M, the yellow pigment dispersion Y, or the black pigment dispersion K) and, and each component was mixed so as to achieve the following ink composition, thereby preparing ink compositions. The prepared ink compositions were each charged in a plastic disposable syringe and filtered through a PVDF 5 μm filter (trade name: MILLEX-SV, manufactured by Millipore Corporation; diameter: 25 mm) to provide final ink compositions.

The formulation of a cyan color ink composition (a cyan ink C1) is as follows. Formulation of Cyan ink C1

Cyan pigment (pigment blue 15:3): 4% by mass

Polymer dispersant P-1 (in terms of solid content): 2% by mass

Fluorine-containing copolymer FL-1 (in terms of solid content): 4% by mass

SUNNIX GP250 (trade name, manufactured by Sanyo Chemical Industries, Ltd., water-soluble organic solvent): 10% by mass Tripropylene glycol monoethyl ether (TPGmME) (manufactured by Wako Pure Chemical Ind., water-soluble organic solvent): 6% by mass OLFINE E1010 (trade name, manufactured by Nissin Chemical Industry Co., Ltd., surfactant): 1% by mass Ion exchange water was added to the formulation so that the sum of the amounts of the components becomes 100% by mass.

Preparation of Magenta Ink M1

A magenta ink M1 was prepared so as to have the same formulation as that of the cyan ink C1 except that, in place of the cyan pigment, the same amount of a magenta pigment (pigment red 122) was used.

Preparation of Yellow Ink Y1

A yellow ink Y1 was prepared so as to have the same formulation as that of the cyan ink C1 except that, in place of the cyan pigment, the same amount of a yellow pigment (pigment yellow 74) was used.

Preparation of Black Ink K1

A black ink K1 was prepared so as to have the same formulation as that of the cyan ink C1 except that, in place of the cyan pigment, the same amount of black pigment (carbon black) was used.

Preparation of Cyan Inks C2 to C8

Cyan inks C2 to C8 were prepared so as to respectively have the same formulation as that of the cyan ink C1 except that, in place of the fluorine-containing copolymer FL-1, the same amount of the respective fluorine-containing copolymer shown in the following Table 1 was used.

Preparation of Magenta Inks M2 to M8

Magenta inks M2 to M8 were prepared so as to respectively have the same formulation as that of the magenta ink M1 except that, in place of the fluorine-containing copolymer FL-1, the same amount of the respective fluorine-containing copolymer shown in the following Table 1 was used.

Preparation of Yellow Inks Y2 to Y8

Yellow inks Y2 to Y8 were prepared so as to respectively have the same formulation as that of the yellow ink Y1 except that, in place of the fluorine-containing copolymer FL-1, the same amount of the respective fluorine-containing copolymer shown in the following Table 1 was used.

Preparation of Black Inks K2 to K8

Preparation of Black inks K2 to K8 were prepared so as to respectively have the same formulation as that of the black ink K1 except that, in place of the fluorine-containing copolymer FL-1, the same amount of the respective fluorine-containing copolymer shown in the following Table 1 was used.

The surface tension, viscosity, volume average particle diameter, and pH of each ink composition were measured. The obtained physical property values are shown in Table 1.

The measurement of the surface tension was performed at 25° C. using AUTOMATIC SURFACE TENSIOMETER CBVP-Z (trade name, manufactured by Kyowa Interface Science Co., LTD.) by Wilhelmy method employing a platinum plate.

The measurement of viscosity was performed at 20° C. using VISCOMETER TV-22 (trade name, manufactured by TOM SANGYO CO., LTD).

The measurement of the volume average particle diameter of each ink composition was performed by a commonly-known method using a ultrafine particle size distribution meter (trade name: NANO TRACK UPA-EX150, manufactured by Nikkiso Co., Ltd.).

The pH of each ink composition was measured at 25° C. using a pH meter (trade name: WM-50EG, manufactured by TOA ELECTRIC INDUSTRIAL CO., LTD.).

TABLE 1

| | Surface tension (mN/M) | Viscosity (mPa·S) | Volume average particle diameter (nm) | pH | Copolymer |
|---|---|---|---|---|---|
| C1 | 32.9 | 4.95 | 91.6 | 8.99 | FL-1 |
| M1 | 33.0 | 5.37 | 91.4 | 8.84 | FL-1 |
| Y1 | 33.6 | 4.72 | 95.1 | 8.70 | FL-1 |
| K1 | 33.2 | 4.24 | 80.9 | 8.75 | FL-1 |
| C2 | 35.4 | 5.05 | 92.6 | 8.84 | FL-4 |
| M2 | 35.5 | 5.47 | 92.4 | 8.69 | FL-4 |
| Y2 | 36.1 | 4.82 | 95.1 | 8.55 | FL-4 |
| K2 | 35.7 | 4.34 | 81.9 | 8.60 | FL-4 |
| C3 | 34.4 | 4.65 | 92.6 | 9.14 | FL-7 |
| M3 | 34.5 | 5.07 | 92.4 | 9.09 | FL-7 |
| Y3 | 35.1 | 4.42 | 95.1 | 8.85 | FL-7 |
| K3 | 34.7 | 3.94 | 81.9 | 8.90 | FL-7 |
| C4 | 33.4 | 5.25 | 93.6 | 9.09 | FL-8 |
| M4 | 33.5 | 5.67 | 93.4 | 9.04 | FL-8 |
| Y4 | 34.1 | 5.02 | 96.1 | 8.80 | FL-8 |
| K4 | 33.7 | 4.54 | 82.9 | 8.85 | FL-8 |
| C5 | 33.9 | 4.65 | 92.6 | 8.94 | FL-11 |
| M5 | 34.0 | 5.07 | 92.4 | 8.79 | FL-11 |
| Y5 | 34.6 | 4.42 | 95.1 | 8.65 | FL-11 |
| K5 | 34.2 | 3.94 | 81.9 | 8.70 | FL-11 |
| C6 | 36.4 | 5.15 | 91.6 | 8.64 | FL-19 |
| M6 | 36.5 | 5.57 | 91.4 | 8.49 | FL-19 |
| Y6 | 37.1 | 4.92 | 95.1 | 8.35 | FL-19 |
| K6 | 36.7 | 4.44 | 80.9 | 8.40 | FL-19 |
| C7 | 32.4 | 4.55 | 92.6 | 8.89 | B-01 |
| M7 | 32.5 | 4.97 | 92.4 | 8.74 | B-01 |
| Y7 | 33.1 | 4.32 | 95.1 | 8.60 | B-01 |
| K7 | 32.7 | 3.84 | 81.9 | 8.65 | B-01 |
| C8 | 35.9 | 5.35 | 93.6 | 9.19 | BH-1 |
| M8 | 36.0 | 5.77 | 93.4 | 9.14 | BH-1 |
| Y8 | 36.6 | 5.12 | 96.1 | 8.90 | BH-1 |
| K8 | 36.2 | 4.64 | 82.9 | 8.95 | BH-1 |
| C9 | 34.9 | 4.75 | 92.6 | 9.04 | — |
| M9 | 35.0 | 5.17 | 92.4 | 8.89 | — |
| Y9 | 35.6 | 4.52 | 95.1 | 8.75 | — |
| K9 | 35.2 | 4.04 | 81.9 | 8.80 | — |

Preparation of Reaction Liquid

Each component was mixed so as to achieve the following formulation, thereby preparing a reaction liquid (1). The physical property values of the reaction liquid (1) were as follows: viscosity of 2.6 mPa·s, surface tension of 37.3 mN/m, and pH of 1.6. The surface tension, viscosity, and pH were measured by substantially the same method as above.

| Formulation of Reaction liquid (1) | |
|---|---|
| Malonic acid (divalent carboxylic acid, manufactured by Wako Pure Chemical Ind. Ltd.) | 15% by mass |
| Diethylene glycol monomethyl ether (manufactured by Wako Pure Chemical Ind. Ltd. Industry) | 20% by mass |
| N-oreoyl-N-methyltaurine sodium (surfactant) | 1% by mass |
| Ion exchange water | 64% by mass |

Preparation of Ink Set

Ink set 1 was obtained using a combination of the ink compositions (the cyan ink C1, the magenta ink M1, the yellow ink Y1, and the black ink K1) and the reaction liquid (1).

Ink sets 2 to 8 were obtained in a similar manner, except that the cyan ink C1, the magenta ink M1, the yellow ink Y1, and the black ink K1 in the preparation of the ink set 1 were respectively replaced by any of the cyan inks C2 to C5, the magenta inks M2 to M5, the yellow inks Y2 to Y5 and the black inks K2 to K5 shown in the following Table 2.

Image Recording and Evaluation

Images were recorded using the ink sets 1 to 8 with including or omitting a heat-fixing process as shown in Table 2 and evaluations explained below were performed. The evaluation results are shown in Table 2.

1. Ejection Reliability—

A evaluation sample 1 was prepared by printing, onto a recording medium (trade name: GASSAI SHASHIN SHI-AGE PRO, manufactured by FUJIFILM COPRORATION), 96 lines having a length of 10 cm respectively at the amount of ink droplets of 3.5 pL, an ejection frequency of 24 kHz, and a resolution of a nozzle arrangement direction of 75 dpi×a transfer direction of 1200 dpi by using a printer head (trade name: GEL JET GX5000, manufactured by Ricoh Co., Ltd., full line head) with storage tanks connected thereto being each refilled with each of the corresponding cyan inks C1 to C5, magenta inks M1 to M5, yellow inks Y1 to Y5, and black inks K1 to K5. The intervals between the 96 lines at a 5 cm portion from the droplet ejection initiation portion of the evaluation sample were measured using a dot analyzer (trade name: DA-6000, manufactured by Oji Scientific Instruments), and the standard deviation thereof was calculated as an index of the initial ejection stability.

Next, after the printing was carried out in the preparation of the evaluation samples, the droplet ejection was ceased for 10 minutes under the environment of 25° C. and 55% RH while the printer head was held as it was. Then, printing was carried out under the same conditions, thereby producing an evaluation sample 2. The standard deviation of the intervals between the 96 lines at a 5 cm portion from the droplet ejection initiation portion of the evaluation sample 2 was calculated similarly as above, and the calculated value after the cessation was defined as an index for evaluating the ejection reliability.

In the evaluations above, the cyan inks were warmed in a 30° C. hot bath beforehand and then charged in the corresponding storage tanks connected to the printer head, and simultaneously the printer head was disposed on a thermostatic chamber in such a manner as to maintain an ejection temperature of 30° C., so that each of the inks can be ejected at an ejection temperature of 30° C. From the calculated standard deviation value after the cessation obtained, the ejection reliability was evaluated according to the following evaluation criteria.

Evaluation criteria
S: Less than 4 nm
A: 4 nm or more but less than 5 nm
X: 5 nm or more 2. Nozzle Maintenability An inkjet recording apparatus DIMATIX MATERIAL PRINTER DMP-2831 (trade name, manufactured by FUJI FILM Dimatix, Inc.,) with a cartridge for 10 pl discharge (DMC-11610) modified such that liquid can be supplied externally was prepared. Storage tanks connected thereto were refilled with each of the cyan inks C1 to C8, magenta inks M1 to M8, yellow inks Y1 to Y8, and black inks K1 to K8 respectively.

After continuously discharging each inks for 30 min on a recording medium (GASSAI SHASHIN SHIAGE PRO: described above), a maintenance operation was performed by applying a pressure of 15 KPa to nozzles of the printer for 10 seconds and wiping the nozzles by CLEAN WIPER FF-390C (trade name, manufactured by Kuraray Co.), and then ink ejection was restarted and continued for 5 minutes. After lapse of 5 minutes, solid images (5 cm×5 cm) recorded on the recording medium were visually observed and evaluated with respect to occurrence of white deletions in each solid image in accordance with the following evaluation criteria.
Evaluation criteria
S: No white deletion was observed.
A: Two or fewer white deletions were observed.
B: Three to 10 white deletions were observed.
X: More than white deletions were observed.

3. Rubbing Resistance

A. Evaluation in the Case of Including No Heat-Fixing Process (a) A printer head (trade name: GEL JET GX5000, manufactured by Ricoh Co., Ltd., full line head) was prepared, and storage tanks connected thereto were refilled with each of the cyan inks C1 to C5, magenta inks M1 to M5, yellow inks Y1 to Y5, and black inks K1 to K5. A recording medium TOKUBISHI ART RYOMEN N (trade name, manufactured by Mitsubishi Paper Mills Ltd., water absorption coefficient Ka: 0.21 mL/m$^2$·ms$^{1/2}$) was fixed on a stage movable at 500 mm/second in a given linear direction. Then, the reaction liquid (1) was applied thereto so that the thickness of the coated liquid become about 1.5 nm (equivalent to 0.34 g/m$^2$ of malonic acid) by a wire bar coater, and the resultant was dried for 2 seconds at 50° C. immediately after the application of the reaction liquid (1).

(b) Thereafter, the printer head GELJET GX5000 (described above) was placed so that the main scanning direction (that is, the direction of the line head in which nozzles were arranged) was inclined at an angle of 75.7° relative to the subscanning direction (that is, the direction orthogonal to the direction of the movement of the stage in the same plane. Then, ink droplets were ejected by the line system while moving the recording medium in the subscanning direction at a constant rate under ejection conditions of the amount of ink droplets of 3.5 μL, an ejection frequency of 24 kHz, and a resolution of 1200 dpi×600 dpi to print solid images, thereby obtaining evaluation samples. Immediately after the printing, the samples were dried at 60° C. for 3 seconds.

(c) The printed surfaces of the evaluation samples were each rubbed back and forth 3 times (equivalent to a load of 260 kg/m$^2$) by using a paperweight (weight: 470 g, size: 15 mm×30 mm×120 mm) on which a piece of non-printed paper (TOKUBISHI ART RYOMEN N: described above) cut into 10 mm×50 mm was wound around (area of a contact portion of the non-printed paper and the evaluation sample: 150 mm$^2$).

The printed surfaces after rubbing were visually observed, and evaluated according to the following evaluation criteria.

B. Evaluation in the Case of Including Heat-Fixing Process

Preparation of Samples and Evaluation were Similarly Carried Out as the Case A, except that the following process (b2) was carried out between the process (a) and the process (b).

(b2) Fixing with a nip pressure of 0.25 MPa and a nip width of 4 mm was carried out by making the recording medium pass through between a pair of fixing rolls heated to 60° C. or higher to obtain samples for evaluation.

The fixing rolls are a combination of a heating roll and an opposite roll, in which the heating roll has a SUS cylindrical core metal which is provided with a halogen lamp therein and the surface of which is covered with a silicone resin, and the opposite roll presses against the heating roll.
Evaluation criteria
S: No separation of the image on the printed surface is visually observed.
A: Practically non-problematic, although separation of the image on the printed surface is slightly visually observed.
B: Practically minimum tolerable. Separation of the image on the printed surface is visually observed.
X: Separation of the image on the printed surface, which is practically problematic, is visually observed.

4. Adhesion Resistance

A sample which was prepared in the same manner as those prepared in the evaluation of the rubbing resistance was cut into two pieces, each of which having 3.5 cm×4 cm size. The samples for evaluation were placed on a 10 cm×10 cm acryl plate (7 mm thickness) such that printed surfaces of the samples were faced with each other. 10 pieces of unprinted TOKUBISHI ART RYOMEN N (described above) cut into the same size as the samples were placed over the samples, an acrylic plate of 10 cm×10 cm (7 mm thickness) was further placed thereon, and the resultant was left at 25° C. and 50% RH for 12 hours.

After this leaving, a weight of 1 kg was placed on the uppermost acryl plate (corresponding to weighing of 700 kg/m$^2$), and the resultant was further left for 24 hours.

Further, after storing at 25° C. and 50% RH for 2 hours, the unprinted paper pieces were removed from the samples. The removability of the unprinted paper pieces from the samples and the adhesion of the printed image (colorants) to the unprinted paper pieces were visually observed and evaluated according to the following evaluation criteria.
Evaluation criteria
S: Unprinted paper piece was spontaneously removed from the sample.
A: No color run from the printed image was observed, although there is resistance during removal of the unprinted paper piece.
B: Practically non-problematic. Color run from the printed image was observed.
X: About 50% of the area of the printed image caused color run.

5. Offset Resistance

The fixing roll employed in the preparation of the sample prepared in the evaluation of the rubbing resistance with including the heat-fixing was observed by naked eyes to see the presence/absence of stains on the fixing roll, the result of which is evaluated according to the following evaluation criteria.
Evaluation criteria
A: No offset of the image to the fixing roll was observed.
X: Offset of the image to the fixing roll was observed.

TABLE 2

| | Ink composition | Copolymer | Heat-fixing | Ejection reliability | Nozzle maintenability | Adhesion resistance | Rubbing resistance | Offset resistance | Remarks |
|---|---|---|---|---|---|---|---|---|---|
| Ink set 1 | C1, M1, Y1, K1 | FL-1 | None | S | A | B | B | — | Comp. example |
| Ink set 1 | C1, M1, Y1, K1 | FL-1 | Performed | S | A | S | S | A | The invention |
| Ink set 2 | C2, M2, Y2, K2 | FL-4 | None | A | S | B | B | — | Comp. example |
| Ink set 2 | C2, M2, Y2, K2 | FL-4 | Performed | A | S | S | S | A | The invention |
| Ink set 3 | C3, M3, Y3, K3 | FL-7 | None | A | S | B | B | — | Comp. example |
| Ink set 3 | C3, M3, Y3, K3 | FL-7 | Performed | A | S | S | S | A | The invention |
| Ink set 4 | C4, M4, Y4, K4 | FL-8 | None | S | A | B | B | — | Comp. example |
| Ink set 4 | C4, M4, Y4, K4 | FL-8 | Performed | S | A | S | S | A | The invention |
| Ink set 5 | C5, M5, Y5, K5 | FL-11 | None | S | A | B | B | — | Comp. example |
| Ink set 5 | C5, M5, Y5, K5 | FL-11 | Performed | S | A | S | S | A | The invention |
| Ink set 6 | C6, M6, Y6, K6 | FL-19 | None | A | S | B | B | — | Comp. example |
| Ink set 6 | C6, M6, Y6, K6 | FL-19 | Performed | A | S | S | S | A | The invention |
| Ink set 7 | C7, M7, Y7, K7 | B-01 | None | X | B | X | X | — | Comp. example |
| Ink set 7 | C7, M7, Y7, K7 | B-01 | Performed | X | B | A | A | X | Comp. example |
| Ink set 8 | C8, M8, Y8, K8 | BH-1 | None | X | X | X | X | — | Comp. example |
| Ink set 8 | C8, M8, Y8, K8 | BH-1 | Performed | X | X | A | A | X | Comp. example |
| Ink set 9 | C9, M9, Y9, K9 | — | None | A | A | X | X | — | Comp. example |
| Ink set 9 | C9, M9, Y9, K9 | — | Performed | A | A | X | X | X | Comp. example |

Table 2 shows that The inkjet recording of the invention can achieve excellent ejection reliability and can suppress offset of images even when heat-fixing is performed. Table 2 further shows that The inkjet recording of the invention can achieve improved nozzle maintenability and favorable rubbing resistance.

All publications, patent applications, and technical standards mentioned in this specification are herein incorporated by reference to the same extent as if each individual publication, patent application, or technical standard was specifically and individually indicated to be incorporated by reference.

What is claimed is:

1. An inkjet recording method comprising:
   applying, onto a recording medium, an ink composition comprising a pigment, a copolymer comprising a fluorine atom, a water-soluble organic solvent, and water, thereby forming an image;
   drying the image by removing the water-soluble organic solvent and at least a part of the water from the recording medium; and
   heat-fixing the image onto the recording medium by bringing a surface of the image into contact with a heating member to apply a temperature of 40° C. to 150° C. and a pressure of 0.1 MPa to 3.0 MPa to the image,
   wherein the copolymer comprises a structural unit derived from a first monomer that comprises a fluorine atom and an ethylenically unsaturated bond,
   wherein the first monomer is represented by the following Formula (P):

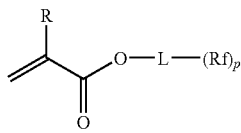

Formula (P)

wherein Rf represents a fluoroalkyl group having 1 to 20 carbon atoms and 1 to 41 fluorine atoms; p represents 1 or 2; L represents a bivalent linking group having 1 to 12 carbon atoms or trivalent linking group having 1 to 12 carbon atoms; and R represents a hydrogen atom or a methyl group.

2. The inkjet recording method of claim 1, wherein the copolymer comprises a structural unit derived from a second monomer that comprises a hydrophilic group and an ethylenically unsaturated bond.

3. The inkjet recording method of claim 1, wherein the copolymer comprises: a structural unit derived from a first monomer that comprises a fluorine atom and an ethylenically unsaturated bond; and a structural unit derived from a second monomer that comprises a hydrophilic group and an ethylenically unsaturated bond.

4. The inkjet recording method of claim 3, wherein the copolymer comprises a structural unit derived from a third monomer that is different from the first monomer and the second monomer and that comprises an ethylenically unsaturated bond.

5. The inkjet recording method of claim 1, wherein the first monomer is a derivative of an acrylic acid comprising a fluorine atom or is a derivative of a methacrylic acid comprising a fluorine atom.

6. The inkjet recording method of claim 1, wherein a content of the structural unit derived from the first monomer in the copolymer is 5% by mass or more with respect to the total amount of the copolymer.

* * * * *